US006954217B1

(12) United States Patent
Nakayama

(10) Patent No.: US 6,954,217 B1
(45) Date of Patent: Oct. 11, 2005

(54) IMAGE PROCESSING COMPUTER SYSTEM FOR PHOTOGRAMMETRIC ANALYTICAL MEASUREMENT

(75) Inventor: Toshihiro Nakayama, Saitama (JP)

(73) Assignee: PENTAX Corporation, Tokyo (JP)

( * ) Notice: Subject to any disclaimer, the term of this patent is extended or adjusted under 35 U.S.C. 154(b) by 369 days.

(21) Appl. No.: 09/608,008

(22) Filed: Jun. 30, 2000

(30) Foreign Application Priority Data

Jul. 2, 1999 (JP) .............................. P11-188678

(51) Int. Cl.[7] .............................. G09G 5/00; G06K 9/00
(52) U.S. Cl. ...................................... 345/619; 382/154
(58) Field of Search ................................ 345/642, 619, 345/723, 724, 725, 726, 764, 779, 804, 805, 345/853; 705/28; 382/154, 284, 199; 715/723, 715/724, 725, 726, 804, 805

(56) References Cited

U.S. PATENT DOCUMENTS

| 4,202,041 | A | * | 5/1980 | Kaplow et al. ................ 341/26 |
| 5,237,648 | A | * | 8/1993 | Mills et al. .................. 345/723 |
| 5,259,037 | A | * | 11/1993 | Plunk ......................... 382/154 |
| 5,381,525 | A | * | 1/1995 | Iguchi ........................ 345/649 |
| 5,404,316 | A | * | 4/1995 | Klingler et al. .............. 345/723 |
| 5,490,246 | A | * | 2/1996 | Brotsky et al. .............. 345/763 |
| 5,491,795 | A | * | 2/1996 | Beaudet et al. .............. 345/804 |
| 5,659,639 | A | * | 8/1997 | Mahoney et al. ............. 382/309 |
| 5,675,752 | A | * | 10/1997 | Scott et al. .................. 345/866 |
| 5,675,753 | A | * | 10/1997 | Hansen et al. ............... 345/744 |
| 5,682,326 | A | * | 10/1997 | Klingler et al. .......... 707/500.1 |
| 5,699,444 | A | | 12/1997 | Palm |
| 5,745,113 | A | * | 4/1998 | Jordan et al. ................ 345/835 |
| 5,745,126 | A | * | 4/1998 | Jain et al. ................... 382/154 |
| 5,819,103 | A | * | 10/1998 | Endoh et al. .................. 710/1 |
| 5,831,611 | A | * | 11/1998 | Kennedy et al. ............. 345/763 |
| 5,850,352 | A | * | 12/1998 | Moezzi et al. ............... 345/419 |
| 5,995,765 | A | | 11/1999 | Kaneko et al. |
| 6,037,940 | A | * | 3/2000 | Schroeder et al. ........... 345/763 |
| 6,081,264 | A | * | 6/2000 | Rosen et al. ................. 345/723 |
| 6,091,427 | A | * | 7/2000 | Boezeman et al. ........... 345/474 |

(Continued)

FOREIGN PATENT DOCUMENTS

| JP | 10141951 | 5/1998 |
| JP | 10170263 | 6/1998 |
| JP | 10185562 | 7/1998 |
| JP | 10185563 | 7/1998 |
| JP | 10221072 | 8/1998 |
| JP | 10253875 | 9/1998 |
| JP | 10293026 | 11/1998 |
| JP | 10307025 | 11/1998 |
| JP | 11295065 | 10/1999 |

*Primary Examiner*—Ryan Yang
(74) *Attorney, Agent, or Firm*—Greenblum & Bernstein, P.L.C.

(57) ABSTRACT

In an image processing computer system for a photogrammetric analytical measurement in which a survey map is produced by connecting a first group including at least a set of pictures featuring a photographed target located at a first target position and a second group including at least a set of pictures featuring a photographed target located at a second target position to each other, a monitor displays a scene including a picture-display area and an editing-display area. On the picture-display area, only one picture in a set included in said first group and only one picture in a set included in said second group are selectively displayed. A displayed picture is transferred from said picture-display area to said editing-display area and vice versa. Connection relationships between pictures are visually displayed on the editing-display area.

21 Claims, 22 Drawing Sheets

U.S. PATENT DOCUMENTS

| | | |
|---|---|---|
| 6,108,497 A | 8/2000 | Nakayama et al. |
| 6,144,375 A * | 11/2000 | Jain et al. ................. 707/500.1 |
| 6,144,761 A * | 11/2000 | Kaneko et al. ............. 382/154 |
| 6,154,601 A * | 11/2000 | Yaegashi et al. .............. 386/52 |
| 6,157,747 A * | 12/2000 | Szeliski et al. ............. 382/284 |
| 6,204,840 B1 * | 3/2001 | Petelycky et al. ....... 707/500.1 |
| 6,236,395 B1 * | 5/2001 | Sezan et al. ................. 345/723 |
| 6,304,669 B1 * | 10/2001 | Kaneko et al. ............. 382/154 |
| 6,327,420 B1 * | 12/2001 | Furukawa .................... 386/52 |
| 6,396,491 B2 * | 5/2002 | Watanabe et al. ........... 345/419 |
| 6,426,759 B1 * | 7/2002 | Ting et al. .................. 345/763 |
| 6,442,293 B1 * | 8/2002 | Ito et al. ...................... 382/154 |
| 6,463,444 B1 * | 10/2002 | Jain et al. ................. 707/104.1 |
| 6,469,715 B1 * | 10/2002 | Carter et al. ................ 345/763 |
| 6,487,517 B2 * | 11/2002 | Sakai et al. ................. 702/158 |
| 6,618,497 B1 * | 9/2003 | Nakayama .................. 382/154 |
| 6,618,498 B1 * | 9/2003 | Nakayama .................. 382/154 |
| 6,647,146 B1 * | 11/2003 | Davison et al. ............. 382/199 |
| 6,693,650 B2 * | 2/2004 | Wakashiro et al. ......... 715/788 |
| 6,762,766 B1 * | 7/2004 | Nakayama .................. 345/581 |
| 6,768,813 B1 * | 7/2004 | Nakayama .................. 382/154 |

* cited by examiner

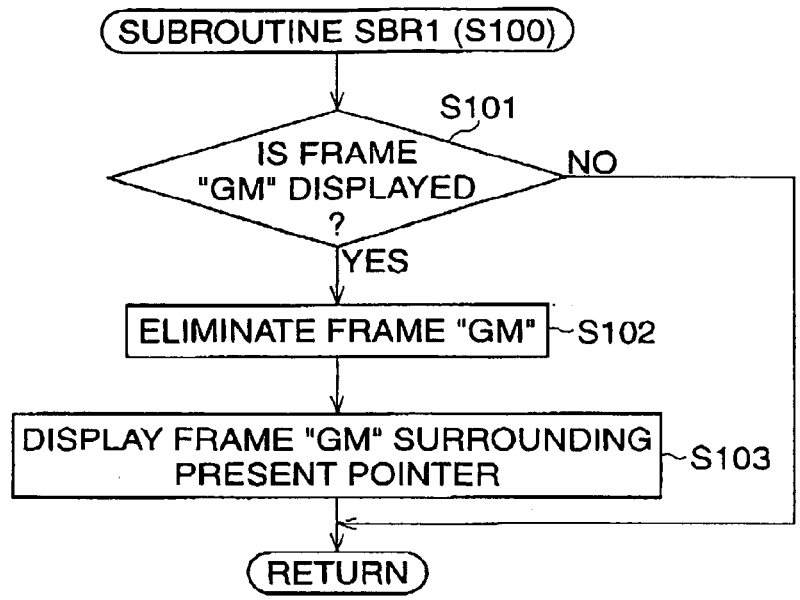
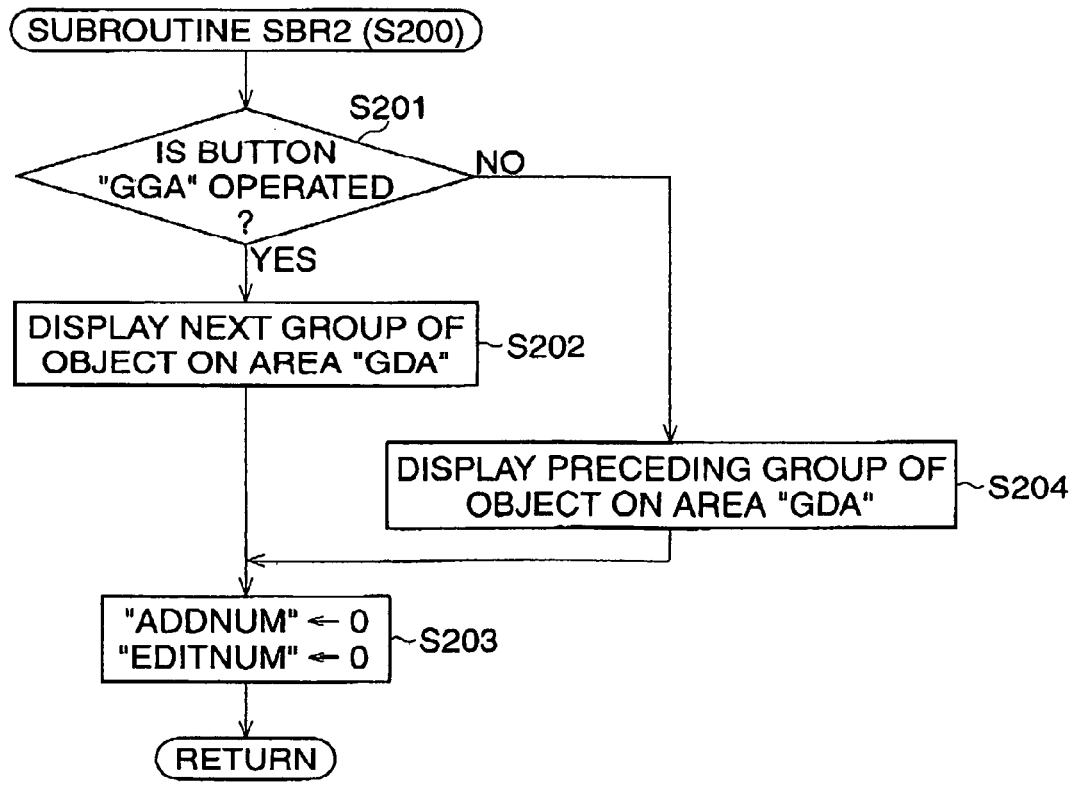

IMAGE PROCESSING COMPUTER SYSTEM FOR PHOTOGRAMMETRIC ANALYTICAL MEASUREMENT

BACKGROUND OF THE INVENTION

1. Field of the Invention

The present invention relates to an image-processing computer system for a photogrammetric analytical measurement, in which a survey map is electronically produced based on a pair of photographed pictures obtained at two different photographing positions.

2. Description of the Related Art

For example, photogrammetry is carried out at a traffic accident spot. The traffic accident spot is photographed by an electronic still video digital camera in at least two different positions, and a survey map of the traffic accident spot is produced based on a pair of photographed pictures obtained at the different positions, as disclosed in, for example, Unexamined Japanese Patent Publications No. 10-221072 and No. 10-293026.

Before accurately scaled distances and lengths can be reproduced on the survey map, a standard measurement scale or target must be recorded together with the photographed objects in the pictures. The target is disclosed in, for example, Unexamined Japanese Patent Publications No. 10-141951, No. 10-170263, No. 10-185562, No. 10-185563, No. 10-293026, No. 10-307025 and No. 11-295065.

For the production of the survey map, a two-dimensional coordinate system is defined on each of the pictures, and two-dimensional positions of the objects, which are recorded on each picture, are determined by the two-dimensional coordinate system. Also, a three-dimensional coordinate system is defined on the target, and three-dimensional positions of the recorded objects are determined based on the two-dimensional positions of the objects with respect to the three-dimensional coordinate system. Accordingly, it is possible to produce a survey map by projecting the three-dimensional coordinates, representing the objects, on one of the three planes defined by the three-dimensional system. Of course, the production of the survey map is performed using an image-processing computer system.

For example, to produce a long portion of a roadway as a survey map, it is necessary to obtain plural pairs of pictures to cover the length of the roadway, and the target must be moved from one position to another position in the length of the roadway. In this case, a survey map section is produced based on each pair of pictures, and the survey map is obtained by successively connecting the survey map sections to each other. Of course, the production of all the survey map sections must be united with respect to a single three-dimensional coordinate system defined on the target located at a previously-selected position. Thus, when the plural pairs of pictures are processed using the image-processing computer system by an operator to produce the survey map, it must be always known by the operator which target position each pair of pictures features and where each picture is photographed, resulting in facilitation of the production of the survey map. However, in reality, it is difficult to visually recognize the circumstances of a picture among other many pictures.

SUMMARY OF THE INVENTION

Therefore, an object of this invention is to provide an image processing computer system for a photogrammetric analytical measurement, which is constituted such that the circumstances of each picture to be processed to produce a survey map can be visually and easily recognized, resulting in facilitation of the production of the survey map.

In accordance with an aspect of the present invention, there is provided an image processing computer system for a photogrammetric analytical measurement in which a survey map is produced by connecting at least two sets of pictures featuring a photographed target located at a given target position. The image processing computer system comprises: a monitor that displays a scene including a picture-display area and an editing-display area; a first monitor controller that selectively displays only one picture in each sot on the picture-display area of the scene; a second monitor controller that transfers a displayed picture from the picture-display area to the editing-display area and vice versa; and a third monitor controller that visually displays a connection relationship between pictures displayed on the editing-display area of the scene.

In accordance with another aspect of the present invention, there in provided an image processing computer system for a photogrammetric analytical measurement in which a survey map is produced by connecting a first group including at least a set of pictures featuring a photographed target located at a first target position and a second group including at least a set of pictures featuring a photographed target located at a second target position to each other. The image processing computer system comprises: a monitor that displays a first scene including a picture-display area and an editing-display area; a first monitor controller that selectively displays only one picture in a set included in the first group and only one picture in a set included in the second group, on the picture-display area of the first scene; a second monitor controller that transfers a displayed picture from the picture-display area to the editing-display area and vice versa; and a third monitor controller that visually displays a connection relationship between pictures displayed on the editing-display area of the first scene.

Preferably, a display of pictures on the picture-display area and the editing-display area is performed at a reduced size.

When each of the first and second groups includes at least two sets of pictures, all respective pictures, included in the sets forming each group, are displayed on the picture-display area in photographing order under control of the first monitor controller. When one of the respective pictures, included in the sets forming each group, is transferred from the picture-display area to the editing-area and vice versa, a transfer of the remaining pictures may be simultaneously performed under control of the second monitor controller.

Also, when one of the respective pictures, included in the sets forming each group, is transferred from the picture-display area to the editing-area, a transfer of the remaining pictures may be simultaneously performed under control of the second monitor controller, and all the respective pictures, included in the sets forming the other group, may be displayed on the picture-display area under controller of the first monitor controller.

The image processing computer system may further comprises a transfer-indicator that indicates a picture to be transferred from the picture-display area to the editing-display area and vice versa. In this case, a marker is displayed on the editing-display area under control of the second monitor controller to indicate a location, at which the picture is to be transferred from the picture-display area to the editing-display area, when the picture is indicated by the transfer-indicator.

Preferably, the marker comprises a frame representing an outline of the picture to be transferred from the picture-display area to the editing-display area, and is movable under control of the second monitor controller in the editing-display area.

For the visual connection-relationship between pictures displayed on the editing-display area of the first scene, a connecting-strip is displayed on the editing-display area under control of the third monitor controller to indicate the connection relationship between the pictures displayed on the editing-display area of the first scene. Preferably, the connecting-strip is displayed as a strip connected between the centers of the two adjacent pictures at the back faces thereof.

The image processing computer system may further comprise a fourth monitor controller that moves a picture, transferred from the picture-display area to the editing-display area, from one location to another location on the editing-display area, and a movement-indicator that indicates a picture to be moved on the editing-display area. A marker may be displayed on the editing-display area under control of the fourth monitor controller to indicate a location, at which the picture is to be moved, when the picture is indicated by the movement-indicator. Preferably, the maker concerned comprises a frame representing an outline of the picture to be moved on the editing-display area.

The image processing computer system may further comprises a connection-indicator that indicates a picture, displayed on the picture-display area, and a picture, displayed on the editing-display area, to be connected to each other when the former picture is transferred to the editing-display area, and a fourth monitor controller that changes the first scene of the monitor into a second scene in which a connection-processing for connecting the pictures to each other is performed before the former picture is transferred to the editing-display area. In this case, preferably, two pictures, included in a set forming the first group, and two pictures, included in a set forming the second group, are displayed on the second scene of the monitor under control of the fourth monitor controller for the connection-processing. Further, preferably, the two pictures, included in a set forming the first group, and the two pictures, included in a set forming the second group, have at least two common connecting-image-points for the connection-processing.

In accordance with yet anther aspect of the present invention, there is provided an image processing method for a photogrammetric analytical measurement in which a survey map is produced by connecting a first group including at least a set of pictures featuring a photographed target located at a first target position and a second group including at least a set of pictures featuring a photographed target located at a second target position to each other. The image processing method comprises steps of: displaying a scene, including a picture-display area and an editing-display area, on a monitor; selectively displaying only one picture in a set included in the first group and only one picture in a set included in the second group, on the picture-display area of the scene; transferring a displayed picture from the picture-display area to the editing-display area; and visually displaying a connection relationship between pictures displayed on the editing-display area of the scene.

In accordance with still yet another aspect of the present invention, there is provided a memory medium storing an image processing program for executing the above-mentioned method.

BRIEF DESCRIPTION OF THE DRAWINGS

The object and other objects of the present invention will be better understood from the following description, with reference to the accompanying drawings, in which:

FIG. 15 is a flowchart for a subroutine executed in step S100 of the object-connecting routine of FIG. 14;

FIG. 16 is a flowchart for a subroutine executed in step S200 of the object-connecting routine of FIG. 14;

DESCRIPTION OF THE PREFERRED EMBODIMENTS

Figure 1:
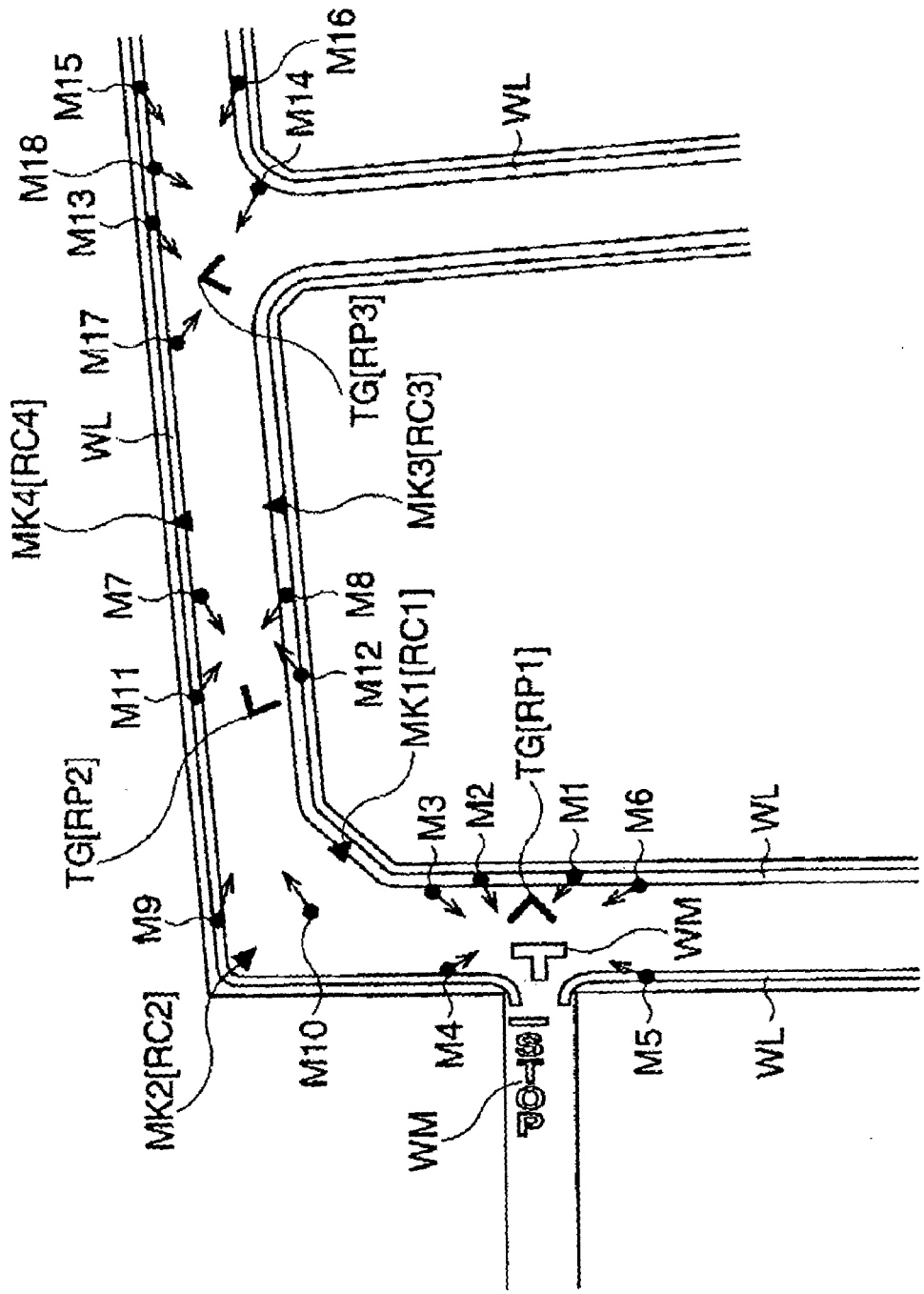
FIG. 1 is a plan view of a roadway for explaining a photogrammetric analytical measurement, which is utilized by a photogrammetric image processing computer system according to the present invention.

With reference to FIG. 1, a roadway is shown as a plan view, by way of example, for explaining a photogrammetric analytical measurement which utilizes by a photogrammetric image processing computer system of the present invention. In this example, the roadway is photographed by an electronic still video digital camera 50 (FIG. 4) at eighteen photographing positions, which are represented by small solid circles indicated by references M1 to M18, respectively. Each of the eighteen pictures, photographed at the photographing positions M1 to M18, is processed by a control circuit of the digital camera 50, and is then stored as a frame of image data in a memory medium, such as an IC memory card, held in the camera 50. The memory card is loaded in the photogrammetric image processing computer system according to the present invention, and a survey map of the roadway is produced on the basis of the eighteen frames of image data read from the memory card, as stated in detail hereinafter.

Each of the photographing positions M1 to M18 is defined as a back principal point M (FIG. 4) of a photographing optical system of the digital camera 50. As shown in FIG. 1, an arrow is projected from each of the photographing positions M1 to M18 to indicate a photographing direction at the corresponding photographing position (M1, M2, . . . M17, M18). The photographing direction is defined as an orientation of an optical axis of the photographing optical system of the digital camera 50.

The eighteen photographing operations are performed in the order of the photographing positions M1 to M18. Also, when each of the photographing operations is performed, an object to be surveyed is photographed together with a target, indicated by reference TG (FIG. 4), which serves as a standard measurement scale. In FIG. 1, although three targets TG are shown, only one target TG is used. Respective bracketed references RP1, RP2 and RP3, appended to the references TG, represents target positions at which the target TG is to be located.

In the example of FIG. 1, the target TG is initially located at the first target position RP1, and the first, second, third, fourth, fifth and sixth photographing operations are performed at the positions M1 to M6. After the completion of the sixth photographing operation, the target TG is moved from the first target position RP1 to the second target position RP2, and the seventh, eighth, ninth and tenth photographing operations are performed at the positions M7 to M10. After the completion of the tenth photographing operation, the target TG is further moved from the second target position RP2 to the third target position RP3, and the eleventh, twelfth, thirteenth, fourteenth, fifteenth, sixteenth, seventeenth and eighteenth photographing operations are performed at the positions M11 to M18.

The target TG is provided with a movement sensor for detecting the movement of the target TG, as disclosed in Unexamined Japanese Patent Publication No. 11-295065, and a tilt-angle sensor for detecting a tilt-angle of the target TG, as disclosed in Unexamined Japanese Patent Publication No. 10-185563. Whenever the target TG is moved from a position to another position, the movement sensor detects a movement of the target between the two positions, and outputs a signal representing the movement of the target TG. The tilt-angle sensor detects a tilt-angle of the target TG to a horizontal plane when being located on the roadway, and outputs a tilt-angle signal representing the detected tilt-angle.

The target TG is further provided with a signal processor for processing the respective signals output from the movement sensor and the tilt-angle sensor, and a radio transmitter for transmitting the processed signals to a receiver provided in the camera 50. The transmission of the signals from the radio transmitter is repeated at regular intervals of very short time. Whenever a photographing operation is performed by the camera 50, and the transmitted signals are retrieved from the receiver by the control circuit of the camera 50. The retrieved signals are processed by the control circuit of the camera 50, and are then stored in the memory card, together with a corresponding frame of image data obtained by the photographing operation.

An object to be surveyed is twice photographed by the camera 50 at two different photographing positions and in two different photographing directions. Namely, the two photographing operations are consecutively performed by the camera 50 with respect to the object to be surveyed, and a pair of pictures, on which the object to be surveyed is recorded, is obtained by the two consecutive photographing operations.

In particular, while the target TG is located at the first target position RP1, a first pair of pictures is obtained by the consecutive first and second photographing operations at the positions M1 and M2, a second pair of pictures is obtained by the consecutive third and fourth photographing operations at the positions M3 and M4, and a third pair of pictures is obtained by the consecutive fifth and sixth photographing operations M5 and M6. The first, second and third pairs of pictures form a first group of pictures featuring the first target position RP1 of the target TG.

Also, while the target TG is located at the second target position RP2, a fourth pair of pictures is obtained by the consecutive seventh and eighth photographing operations at the positions M7 and M8, and a fifth pair of pictures is obtained by the consecutive ninth and tenth photographing operations at the positions M9 and M10. The fourth and fifth pairs of pictures form a second group of pictures featuring the second target position RP2 of the target TG.

Further, while the target TG is located at the third target position RP3, a sixth pair of pictures is obtained by the consecutive eleventh and twelfth photographing operations at the positions M11 and M12, a seventh pair of pictures is obtained by the consecutive thirteenth and fourteenth photographing operations at the positions M13 and M14, an eighth pair of pictures is obtained by the consecutive fifteenth and sixteenth photographing operations M15 and M16, and a ninth pair of pictures is obtained by the consecutive seventeenth and eighteenth photographing operations at the positions M17 and M18. The sixth, seventh, eighth and ninth pairs of pictures form a third group of pictures featuring the third target position RP3 of the target TG.

In order for the production of the survey map of the roadway, nine survey map sections are produced on the basis of the first, second, third, fourth, fifth, sixth, seventh, eighth and ninth pairs of pictures, respectively, and then are successively connected to each other.

For the connection between one of the first, second and third map sections, derived from the first group of pictures, and one of the fourth and fifth map sections, derived from the second group of pictures, a first set of markers MK1 and MK2 is located between the first and second target positions RP1 and RP2, and the first set of markers MK1 and MK2 is photographed in at least one pair of pictures, included in the first group of pictures, and in at least one pair of pictures, included in the second group of pictures.

Similarly, for the connection between one of the fourth and fifth map sections, derived from the second group of pictures, and one of the sixth, seventh, eighth and ninth map sections, derived from the third group of pictures, a second set of markers MK3 and MK4 is located between the second and third target positions RP2 and RP3, and the second set of markers MK3 and MK4 is photographed in at least one pair of pictures, included in the second group of pictures, and in at least one pair of pictures, included in the third group of pictures.

In FIG. 1, respective bracketed references RC1 and RC2, appended to the references MK1 and MK2, represent connection points for connecting two survey map sections derived from the first and second groups of pictures. Similarly, respective bracketed references RC3 and RC4, appended to the references MK3 and MK4, represent connection points for connecting two survey map sections derived from the second and third groups of pictures.

In FIG. 1, although each of the markers MK1, MK2, MK3 and MK4 is shown as a small solid triangle, it may comprise a cone-shaped marker. In this case, the connection point is represented by an apex of the cone-shaped marker.

In the example of FIG. 1, a single set of markers may be used for the two sets of markers (MK1 and MK2; MK3 and MK4). Of course, in this case, the single set of makers are initially located between the first and second target positions RP1 and RP2, and is then moved to a location between the second and third target positions RP2 and RP3 after the photographing operations for the second group of pictures are completed.

Note, in FIG. 1, references WL indicate white lines painted along the sides of the roadway, and references WM indicate white traffic symbols painted on the roadway.

Figure 2:
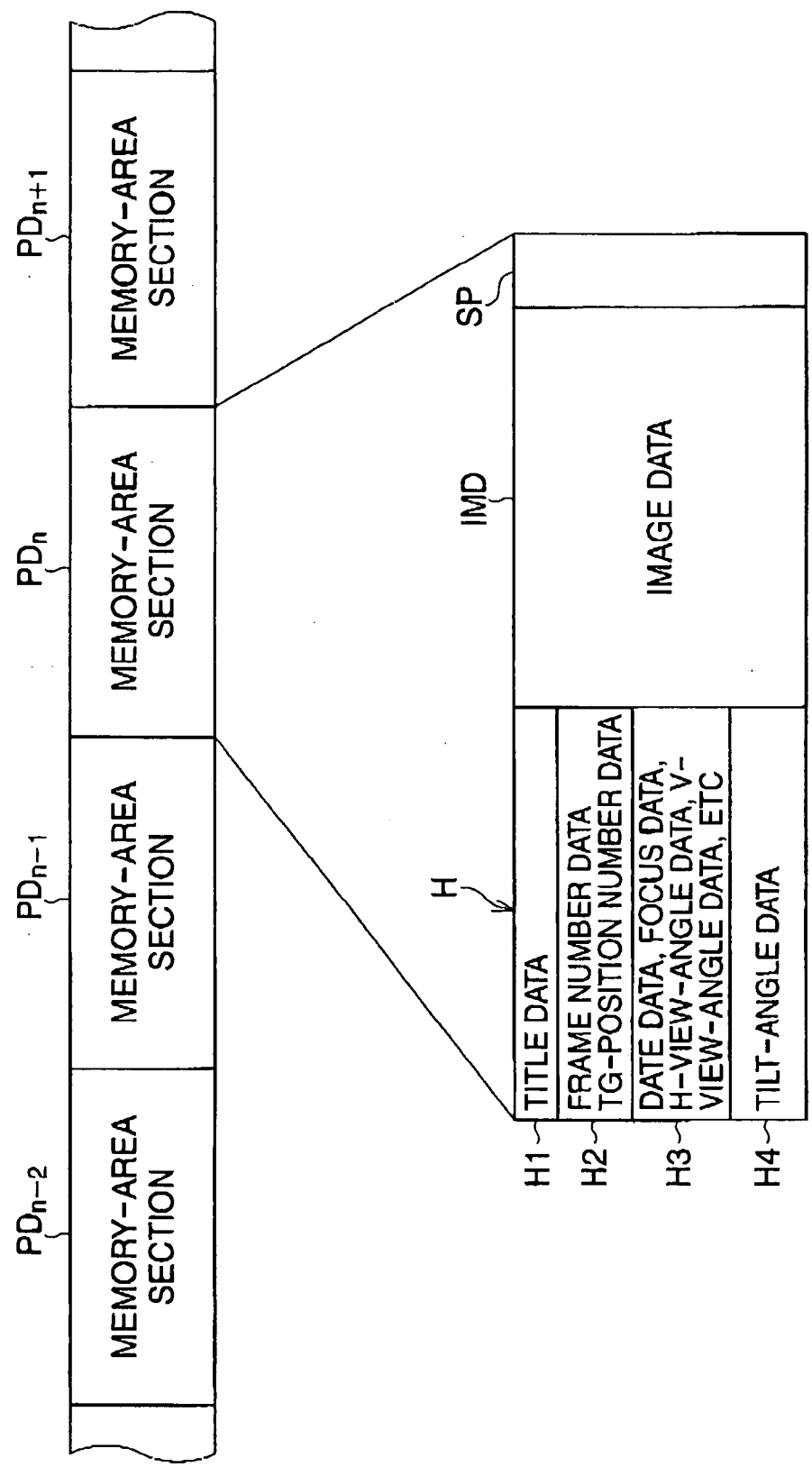
FIG. 2 is a conceptual schematic view showing an example of a format of a memory card, which is detachably held in an electronic still video digital camera utilized in the photogrammetric analytical measurement, and which is loaded in the photogrammetric image processing computer system according to the present invention.

FIG. 2 conceptually shows a format of the IC memory card held in the camera 50. As shown in this drawing, a memory area of the memory card is sectioned into a plurality of memory-area sections, some of which are indicated by references $PD_{n-2}$, $PD_{n-1}$, $PD_n$ and $PD_{n+1}$, and each of the memory-area area sections (. . . , $PD_{n-2}$, $PD_{n-1}$ $PD_n$ and $PD_{n+1}$, . . .) includes an image area IMD, a header area H and a margin area SP. Of course, the image area IMD is provided for storing a frame of image data representing a photographed picture. The header area H is sectioned into subheader areas H1, H2, H3 and H4 for storing various particular data concerning the photographed picture. The margin area SP is provided for distinguishing between the two adjacent memory area sections $PD_n$ and $PD_{n+1}$.

The subheader areas H1 is provided for storing a title data of the photographed picture, and the title data is input by manipulating character-inputting-switch buttons provided on a camera body of the camera 50, if necessary.

The subheader area H2 is provided for storing two kinds of number data: a frame number data representing a photographing order and a target-position number data representing a target-position (RP1, RP2, RP3) of the target TG.

For the frame number data, a frame number counter is defined in the control circuit of the camera 50, and, for example, is initially set to be "0". Whenever a photographing operation is performed by the camera 50, the frame number counter is incremented by "1", and is stored as the frame number data in a corresponding subheader area H2. For example, when the first photographing operation is completed at the position M1, the frame number data is stored as "1" in the subheader area H2 of the first memory-area section $PD_1$, and when the eighteenth photographing operation is completed at the position M18, the frame number data is stored as "18" in the subheader area H2 of the eighteenth memory-area section $PD_{18}$.

For the target-position number data, a target-position-number counter is defined in the control circuit of the camera 50, and, for example, is initially set to be "1". Whenever a movement of the target TG from one position to another position is confirmed by detecting the movement-signal transmitted from the radio transmitter of the target TG, the target-position-number counter is incremented by "1", and, whenever a photographing operation is completed by the camera 50, a count number data of the target-position-number counter data is stored as the target-position number data in a corresponding subheader area H2. Thus, when each of the first, second, third, fourth, fifth and sixth photographing operations is completed, the target-position number data is stored as "1" in the subheader area H2 of each memory-area section ($PD_1$, . . . , $PD_6$). Also, when each of the seventh, eighth, ninth and tenth photographing operations is completed, the target-position number data is stored as "2" in the subheader area H2 of each memory-area section ($PD_7$, . . . , $PD_{10}$). Further, when each of the eleventh, twelfth, thirteenth, fourteenth, fifteenth, sixteenth, seventeenth and eighteenth photographing operations is completed, the target-position number data is stored as "3" in the subheader area H2 of each memory-area section ($PD_{11}$, . . . , $PD_{18}$).

In short, the photographed pictures, included in the first group, are featured by "1" as the target-position number data; the photographed pictures, included in the second group, are featured by "2" as the target-position number data; and the photographed pictures, included in the third group, are featured by "3" as the target-position number data.

The subheader area H3 is provided for storing a photographing date data, a focus-distance data, a horizontal view-angle data, a vertical view-angle data, a resolving-power data of a CCD (charge-coupled device) image sensor, used in the camera 50, and so on. These data are automatically stored in the subheader area H3 by the control circuit of the camera 50 whenever a photographing operation is completed.

The subheader area H4 is provided for storing the tilt-angle data of the target TG, which are derived from a tilt-angle signal transmitted from the radio transmitter of the target TG. Namely, as mentioned above, whenever a photographing operation is performed by the camera 50, and the tilt-angle signal is retrieved from the receiver by the control circuit of the camera 50, and the retrieved signal is processed by the control circuit of the camera 50, thereby producing the tilt-angle data to be stored in the subheader H4.

Figure 3:
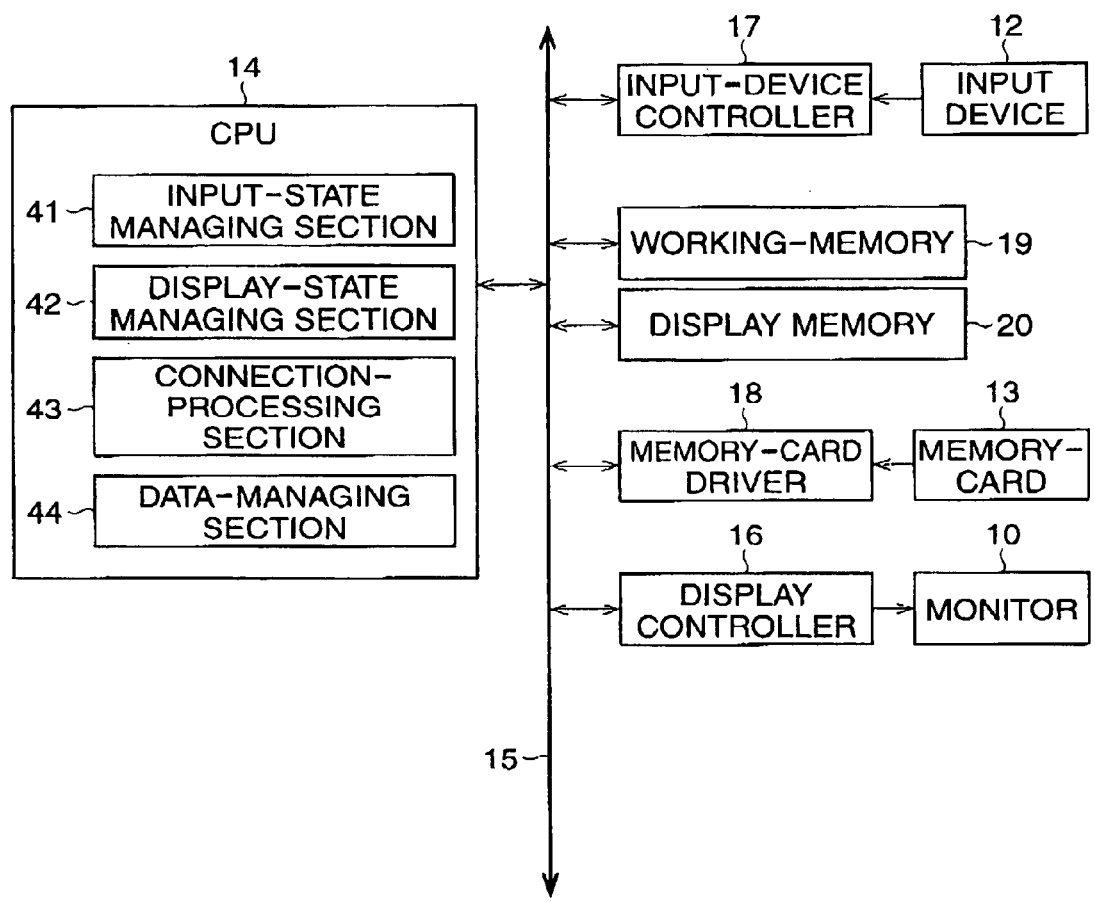
FIG. 3 is a block diagram of the photogrammetric image processing computer system according to the present invention.

With reference to FIG. 3, the photogrammetric image processing computer system according to the present invention is shown as a block diagram.

The image processing computer system comprises: a central processing unit (CPU) 14; a display device 10, such as a CRT monitor; a display controller 16 for controlling the monitor 10; a display memory 20 for storing image data on which a scene to be displayed on the monitor 10 is based; an input device 12 including a keyboard and a mouse; an input-device controller 17 for controlling the input device 12; a memory-card driver 18 for loading the memory card, indicated by reference 13; and a working memory 19 used as a cash memory when executing calculations and processings in the CPU 14. The input-device controller 17, the working memory 19, the display memory 20, the memory-card driver 18 and the display controller 16 are connected to the CPU 14 via a bus 15.

As conceptually shown in FIG. 3, the CPU 14 includes an input-state managing section 41, a display-state managing section 42, a connection-processing section 43, and a data-managing section 44.

The input-state managing section 41 manages various information data and command data input through the input device 12. For example, when a cursor or pointer is moved on the monitor by manipulating the mouse of the input device 12, the movement of the pointer is managed by the input-state managing section 41. Also, by the input-state managing section 41, it is monitored whether character code data is input through the keyboard of the input device 12, and, when the character code data is input, the character code data is converted into image data, which is output to the display memory 20.

The display-state managing section 42 manages a scene to be displayed on the monitor 10. For example, when at least a part of the scene displayed on the monitor 10 is changed, the change of the scene is managed by the display-state managing section. Namely, writing of image data in the display memory 20 is controlled by the display-state managing section 42, thereby changing the scene displayed on the monitor 10. The display controller 16 repeatedly reads the image data from the display memory 20 at a regular interval of given short time, and converts the read image data into a three primary (red, green and blue) video data.

The connection-processing section 43 processes the above-mentioned connection of the survey map sections to each other, thereby producing the survey map of the roadway, as stated in detail hereinafter.

The data-managing section 44 manages various data read from the memory card 13 through the memory-card driver 18, survey map data, various data necessary for producing the survey map data and so on.

After the eighteen photographing operations are completed by the camera 50 at the photographing positions M1 to M18, as shown in FIG. 1, the memory card 13 is removed from the camera 50, and is then loaded in the memory-card driver 18. Of course, the loaded memory card 13 stores the eighteen frames of image data obtained by the eighteen photographing operations performed at the positions M1 and M18.

The eighteen frames of image data are read from the memory card 13 through the memory-card driver 18, and are once stored in the working-memory 19. Then, each of the eighteen photographing positions M1, M2, . . . , M17 and M18 is spatially determined with respect to the target TG on the basis of the corresponding frame of image data.

Figure 4:
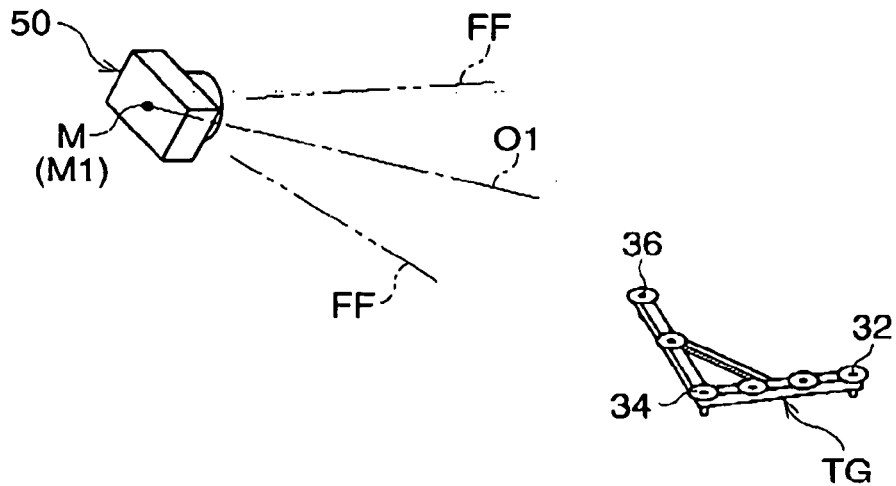
FIG. 4 shows a conceptual perspective view showing a positional relationship between the camera and a target when performing a photographing operation at a first photographing position.
Figure 5:
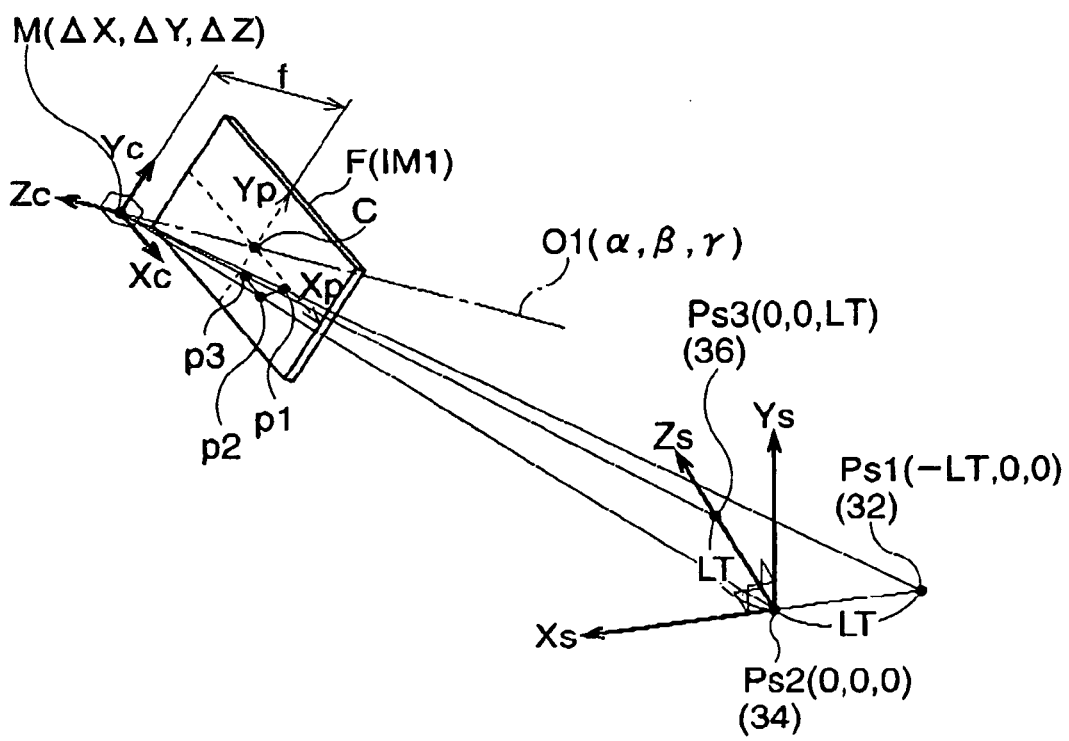
FIG. 5 is a geometrical and conceptual illustration of the positional relationship shown in FIG. 4.
Figure 6:
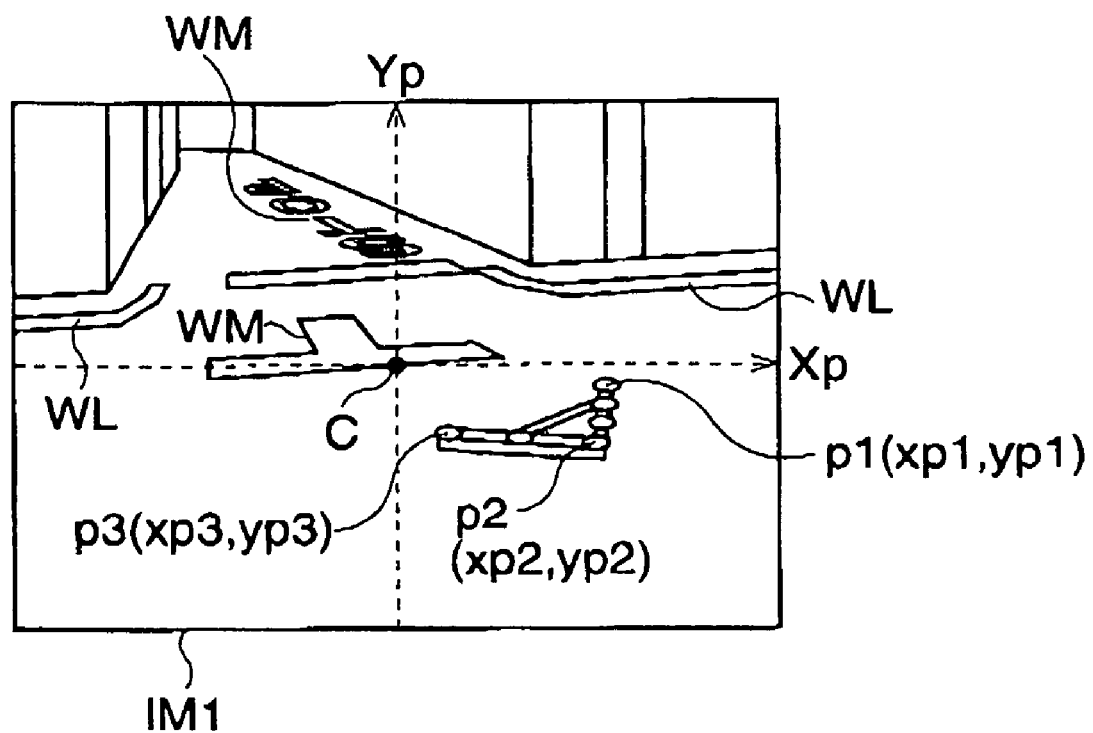
FIG. 6 is an actual view of a picture photographed at the first photographing position shown in FIG. 4.

Referring to FIGS. 4 to 6, the spatial determination of the first photographing position M1 with respect to the target TG will be representatively explained.

FIG. 4 shown a positional relationship between the camera 50 and the target TG when performing the photographing operation at the first photographing position M1. In the positional relationship of FIG. 4, of course, the target TG is within a view-angle defined by the photographing lens system of the camera 50, boundaries of the view-angle being indicated by references FF. Also, the optical axis of the photographing lens system of the camera 50 is indicated by reference 01. As stated hereinbefore, the first photographing position M1 is defined as the back principal point M of the photographing optical system of the camera 50. As is apparent from FIG. 4, the target TG has an L-shaped configuration, and is provided with reference points 32, 34 and 36. A line segment between the reference points 32 and 34 is perpendicular to a line segment between the reference points 34 and 36, and both the line segments have a same length.

Referring to FIG. 5, the positional relationship of FIG. 4 is geometrically and conceptually illustrated. In this drawing, reference F indicates an image plane defined by the photographing lens system of the camera 50, and the picture formed on the image plane F is indicated by reference IM1. The picture IM1, of course, corresponds to the first picture photographed at the position M1 (FIG. 1), and is actually shown in FIG. 6.

As shown in FIG. 5, the optical axis 01 passes through a center C of the image plane F or picture IM1, and a distance between the center C and the back principal point X (M1) is defined as a focal distance f. A three-dimensional $X_S$-$Y_S$-$Z_S$ coordinate system is defined on the target TG located at the first target position RP1, as shown in FIG. 5. Namely, the origin of the $X_S$-$Y_S$-$Z_S$ coordinate system is at the reference point 34 of the target TG, the $X_S$-axis coincides with the line segment between the reference points 32 and 34, and the $Z_S$-axis coincides with the line segment between the reference points 34 and 36. Of course, the $Y_S$-axis is perpendicular to both the $X_S$- and $Z_S$-axes. Note, the $X_S$-$Y_S$-$Z_S$ coordinate system, defined on the target TG located at the first target position RP1, is referred to as a first scene coordinate system hereinafter.

The survey map is produced by projecting three-dimensional coordinates representing an image point on a plane defined by the $X_S$- and $Z_S$-axes of the first scene coordinate system ($X_S$-$Y_S$-$Z_S$-$Z_S$), and the plane concerned must be horizontal before the production of the survey map can be properly performed. Nevertheless, the target TG cannot necessarily be horizontally positioned on the roadway when being located at the first target position RP1. Thus, if the target TG is tilted with respect to a horizontal plane, the plane concerned is also tilted. The tilt of the target TG is corrected on the basis of the tilt-angle data, which is derived from the tilt-angle signal transmitted from the radio transmitter of the target TG. Accordingly, although the target TG is tilted, it is possible to properly perform the definition of the first scene coordinate system ($X_S$-$Y_S$-$Z_S$-$Z_S$).

In FIG. 5, a distance between the reference points 32 and 34 is represented by reference LT, and thus a distance between the reference points 34 and 36 can be represented by the same reference LT, because the respective line segments between the reference points 32 and 34 and between the reference points 34 and 36 have the same length, as mentioned above. Accordingly, as shown in FIG. 5, the reference point 32 is represented by the coordinates $P_{S1}(-LT, 0, 0)$, the reference point 34 is represented by the origin coordinates $P_{S2}(0, 0, 0)$, and the reference point 36 is represented by the coordinates $P_{S3}(0, 0, LT)$.

The back principal point M (M1) is determined with respect to the first scene coordinate system ($X_S$-$Y_S$-$Z_S$). To this end, a two-dimensional $X_P$-$Y_P$ coordinate system is defined on the image plane F or first picture IM1, as shown in FIGS. 5 and 6, and a three-dimensional $X_C$-$Y_C$-$Z_C$ coordinate system is defined on the camera 50, as shown in FIG. 5.

As best shown in FIG. 6, the origin of the $X_P$-$Y_P$ coordinate system coincides with the center C of the image plane F or first picture IM1, and the $X_P$- and $Y_P$-axes extend horizontally and vertically, respectively. The reference points 32, 34 and 36 photographed on the first picture IM1 are represented by two-dimensional coordinates $p_1(xp_1, yp_1)$ $p_2(xp_2, yp_2)$ and $p_3(xp_3, yp_3)$, respectively. Note, the $X_P$-$Y_P$ coordinate system is referred to as a picture coordinate system hereinafter.

Also, as shown in FIG. 5, the origin of the $X_C$-$Y_C$-$Z_C$ coordinate system coincides with the back principal point M (M1), the $Z_C$-axis coincides with the optical axis 01, and the respective $X_C$- and $Y_C$-axes are in parallel to the the $X_P$- and $X_P$-axes of the two-dimensional coordinate system $X_P$-$Y_P$. The origin of the $X_C$-$Y_C$-$Z_C$ coordinate system or back principal point M is represented by three-dimensional coordinates $M(\Delta X, \Delta Y, \Delta Z)$ which are based on the first scene coordinate system $(X_S$-$Y_S$-$Z_S)$. An orientation of the $Z_C$-axis or optical axis 01 is represented by three-dimensional angular coordinates $(\alpha, \beta, \gamma)$ which are defined with respect to the first scene coordinate system $(X_S$-$Y_S$-$Z_S)$. Namely, the $Z_C$-axis or optical axis 01 defines angles of $\alpha$, $\beta$ and $\gamma$ with the $X_S$-, $Y_S$- and $Z_S$- axes of the first scene coordinate system, respectively.

When two-dimensional coordinates $p_i(xp_i, yp_i)$ (i=1, 2, 3), representing the coordinates $p_1(xp_1, yp_1)$, $p_2(xp_2, yp_2)$ and $p_3(xp_3, yp_3)$ based on the picture coordinate system $(X_P$-$Y_P)$ are expressed by three-dimensional coordinates $P_{ci}(P_{cxi}, P_{cyi}, P_{czi})$ based on the camera coordinate system $(X_C$-$Y_C$-$Z_C)$, the X-coordinate $xp_i$ and the Y-coordingate $yp_i$ are represented by the following formulas (1) and (2), respectively:

$$xp_i = f(P_{cxi}/P_{czi}) \quad (1)$$

$$yp_i = f(P_{cyi}/P_{czi}) \quad (2)$$

Herein: "i"=1, 2 or 3, and "f" is the focal distance.

On the other hand, the three-dimensional coordinates $P_{ci}(P_{cxi}, P_{cyi}, P_{czi})$ based on the camera coordinate system $(X_C$-$Y_C$-$Z_C)$ is expressed by three-dimensional coordinates $P_{si}(P_{sxi}, P_{syi}, P_{szi})$ based on the scene coordinate system $(X_S$-$Y_S$-$Z_S)$ as follows:

$$P_{ci} = R(P_{si} - \Delta) \quad (3)$$

$$R = \begin{pmatrix} \cos\beta\cos\gamma & \cos\alpha\sin\gamma + \sin\alpha\sin\beta\cos\gamma & \sin\alpha\sin\gamma - \cos\alpha\sin\beta\cos\gamma \\ -\cos\beta\sin\gamma & \cos\alpha\cos\gamma - \sin\alpha\sin\beta\sin\gamma & \sin\alpha\cos\gamma + \cos\alpha\sin\beta\sin\gamma \\ \sin\beta & -\sin\alpha\cos\beta & \cos\alpha\cos\beta \end{pmatrix}$$

$$\Delta = \begin{pmatrix} \Delta X \\ \Delta Y \\ \Delta Z \end{pmatrix}$$

Herein: "R" is a rotational matrix of the angles $\alpha$, $\beta$, $\gamma$, and "$\Delta$" is a vector representing a movement distance the origin of the camera coordinate system $(X_C$-$Y_C$-$Z_C)$ from the origin of the scene coordinate system $(X_S$-$Y_S$-$Z_S)$.

In short, the three-dimensional coordinates $M(\Delta X, \Delta Y, \Delta Z)$ and the three-dimensional angular coordinates $(\alpha, \beta, \gamma)$ are calculated by the formulas (1), (2) and (3), whereby the back principal point M or first photographing position M1 is spatially determined with respect to the scene coordinate system $(X_S$-$Y_S$-$Z_S)$.

In reality, each of the reference points 32, 34 and 36 is represented as a small white circle, which is formed at a center of a circular black plate element attached to an L-shaped member. By suitably processing a frame of image data read from the memory card 13, the small white circles, representing the reference points 32, 34 and 36, are extracted from the frame of image data, whereby coordinates of each reference point (32, 34, 36) are determined. Namely, in the example shown in FIGS. 4 to 6, the determination of the coordinates $P_{S1}(-LT, 0, 0)$ $P_{S2}(0, 0, 0)$ and $P_{S3}(0, 0, LT)$ are automatically executed by the CPU 14 on the basis of the frame of image data obtained at the first photographing position M1.

The remaining photographing positions M2 to M18 are spatially determined in substantially the same manner as mentioned above. Of course, the spatial determination of the photographing positions M2 to M6 are executed with respect to the first scene coordinate system $(X_S$-$Y_S$-$Z_S)$ defined on the target TG located at the first target position RP1, the spatial determination of the photographing positions M7 to M10 are performed with respect to a second scene coordinate system defined on the target TG located at the second target position RP2, and the spatial determination of the photographing positions M11 to M18 are executed with respect to a third scene coordinate system defined on the target TG located at the third target position RP3.

Note, the above-mentioned spatial determination of the photographing positions M1 to M18 is automatically executed when the eighteen frames of image data are read from the memory-card 13.

When the survey map of the roadway is produced by successively connecting the nine survey map sections to each other, the spatial determination of all the eighteen photographing positions M1 to M18 must be united with respect to any one of the first, second and third scene coordinate systems. For example, when the first scene coordinate system $(X_S$-$Y_S$-$Z_S)$ is selected for the determination of all the photographing positions M1 to M18, the second and third scene coordinate systems must be transformed into the first coordinate system $(X_S$-$Y_S$-$Z_S)$.

Figure 7:
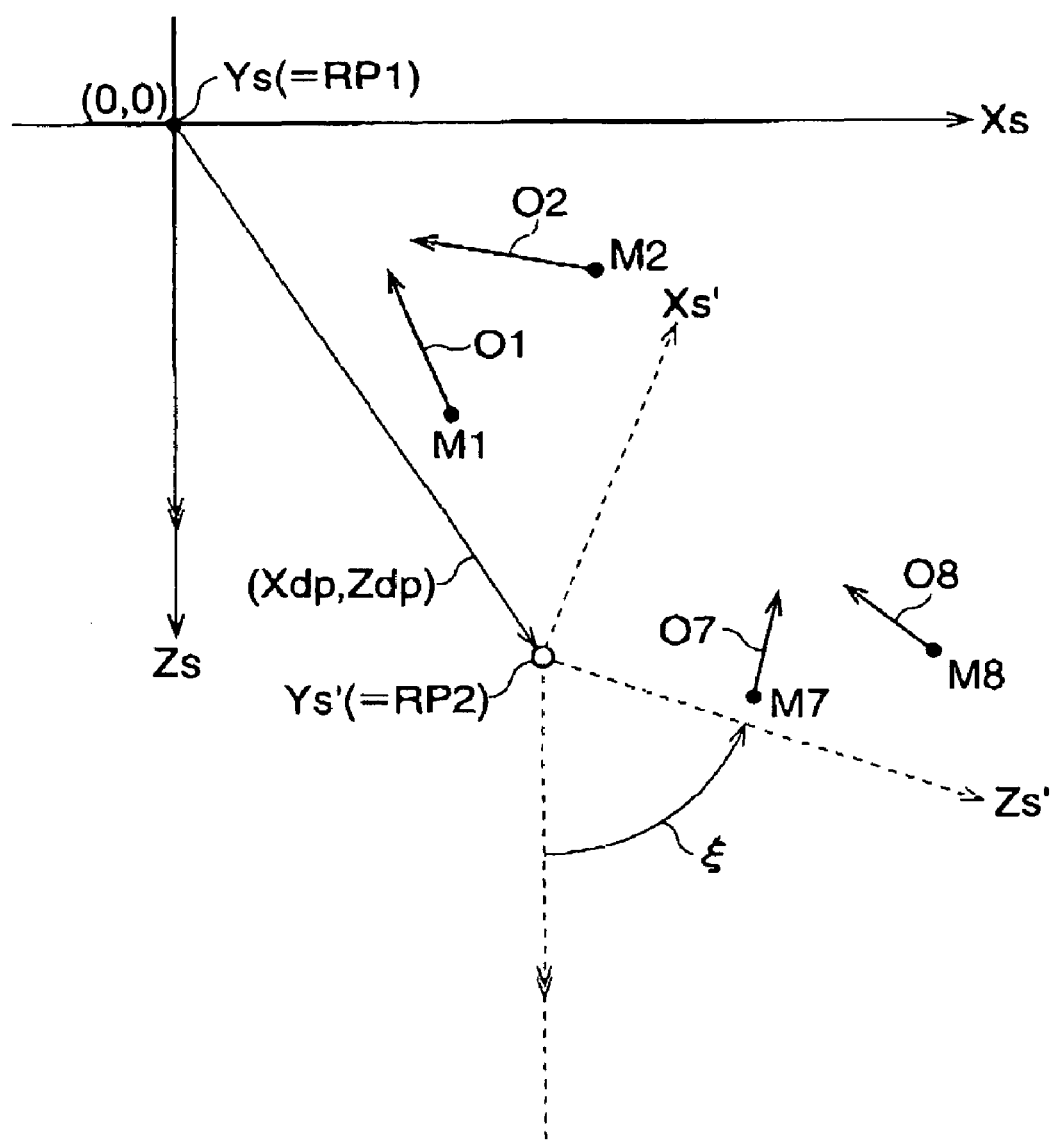
FIG. 7 is a geometrical and conceptual illustration showing a transformation of a second scene coordinate system, defined on the target moved from the position shown in FIG. 4.

Referring to FIG. 7, the transformation of the second scene coordinate system into the first scene coordinate system $(X_S$-$Y_S$-$Z_S)$ is conceptually shown. In this drawing, the three axes of the second scene coordinate system are indicated by references $X_S'$, $Y_S'$ and $Z_S'$ and the movement of the target TG from the first target position RP1 to the second target position RP2 is represented by two-dimensional coordinates $(X_{dp}, Z_{dp})$ based on the first scene coordinate system $(X_S$-$Y_S$-$Z_S)$. Also, an angle of $\xi$ indicates a relative rotational angle of the target TG between the first and second target positions RP1 and RP2. In FIG. 7, each of references O2, O7 and O8 indicates an orientation of the optical axis of the camera 50 located at the corresponding photographing position (M2, M7, M8).

The two-dimensional coordinates $(X_{dp}, Z_{dp})$ and the rotational angle of $\xi$ are determined by calculating the three-dimensional coordinates of the connection points RC1 and RC2 of the cone-shaped markers MK1 and MK2 with respect to the first and second scene coordinate systems $(X_S$-$Y_S$-$Z_S$, $X_S'$-$Y_S'$-$Z_S')$, respectively.

After the determination of the two-dimensional coordinates $(X_{dp}, Z_{dp})$ and the rotational angle of $\xi$, the transformation of the second scene coordinate system $(X_S'$-$Y_S'$-$Z_S')$ into the first scene coordinate system $(X_S$-$Y_S$-$Z_S)$ is performed on the basis of the following formula (4):

$$\begin{pmatrix} x_s \\ z_s \end{pmatrix} = \begin{pmatrix} \cos\xi & -\sin\xi \\ \sin\xi & \cos\xi \end{pmatrix} \begin{pmatrix} x_{s'} \\ z_{s'} \end{pmatrix} + \begin{pmatrix} x_{dp} \\ z_{dp} \end{pmatrix} \quad (4)$$

Of course, the transformation of the third scene coordinate system into the first scene coordinate system ($X_S$-$Y_S$-$Z_S$) is performed in substantially the same manner as mentioned above.

Figure 8:
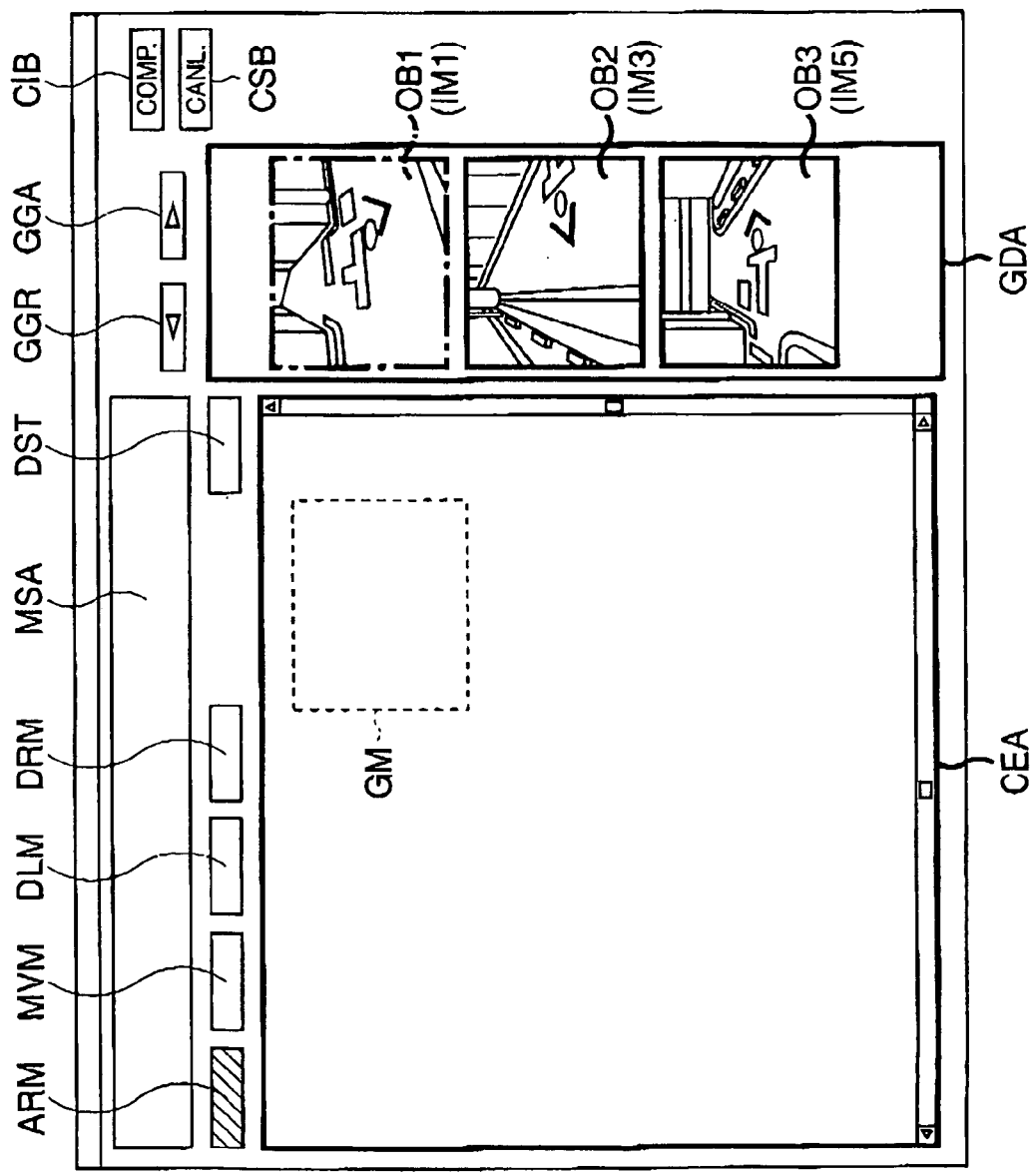
FIG. 8 is a view showing a connection-mode scene of a monitor included in the photogrammetric image processing computer system according to the present invention.

FIG. 8 shows, by way of example, a connection-mode scene, displayed on the monitor 10 for executing a processing for successively connecting the nine pairs of pictures to each other. Note, the connection-mode scene is selected from an initial menu scene (not shown) displayed on the monitor 10 after the image processing computer system is powered ON. As shown in FIG. 8, the connection-mode scene includes a picture-display area GDA and an editing-display area CEA.

As shown in FIG. 8, a part of the pictures included in the first group are displayed on the picture-display area GDA. As mentioned above, the first group of pictures, featuring the target TG located at the first target position RP1, is composed of the first pair of pictures (M1, M2), the second pair of pictures (M3, M4) and the third pair of pictures (M5, M6), and only one picture in each pair is representatively displayed on the picture-display area GDA. In the example shown in FIG. 8, the displayed pictures IM1, IM3 and IM5 are obtained at the first, third and fifth photographing positions M1, M3 and M5. Namely, the pictures IM1, IM3 and IM5 are disposed in the photographing order. The display of the pictures IM1, IM3 and IM5 on the picture-display area GDA is performed at a reduced size, and the reduced sized pictures IM1, IM3 and IM5 are referred to as objects OB1, OB2 and OB3, respectively, hereinafter.

Note, of course, image data for the objects OB1, OB2 and OB3 are produced on the basis of the first, third and fifth frames of image data read from the memory card 13, and are stored in the display memory 20.

As shown in FIG. 8, an advancing button GGA and a returning button GGR are displayed adjacent to the top of the picture-display area GDA. When the advancing button GGA is operated by clicking on it with the mouse, the scene of the picture-display area GDA is changed such that a part of the pictures included in the second group are displayed thereon in substantially the same manner as the part of the pictures included in the first group. When the advancing button GGA is further operated by clicking on it with the mouse, a part of the pictures included in the third group are displayed on the picture-display area GDA in substantially the same manner as the part of the pictures included in the first group. On the other hand, whenever the returning button GGR is operated by clicking on it with the mouse, the scenes of the picture-display area GDA are successively returned. In short, by suitably operating the buttons GGA and GGR, it is possible to selectively display any one of the above-mentioned three parts of the pictures on the picture-display area GDA.

The editing-display area CEA is used as a visual editing area for editing the pictures or objects. As shown in FIG. 8, mode-setting buttons ARM, MVM and DLM are displayed adjacent to the top of the editing-display area CEA.

The mode setting button ARM serves as an object-transferring/connecting-mode button. When the button ARM is operated by clicking on it with the mouse, the button ARM is displayed an object-transferring/connecting mode is set. In reality, the operated button ARM is displayed as if being depressed, whereby it is possible to visually confirm the setting of the object-transferring/connecting mode. In this mode, the pictures or objects are transferred from the picture-display area GDA to the editing-display area CEA, and are visually connected to each other, as mentioned in detail hereinafter. Note, whenever the connection-mode scene (FIG. 8) is selected from the initial menu scene of the monitor 10, the object-transferring/connecting mode is forcibly set.

The mode setting button MVM serves as an object-arranging-mode button. When the button MVM is operated by clicking on it with the mouse, an object-arranging mode is set. The operated button MVM is also displayed as if being depressed, whereby the setting of the object-arranging mode can be visually confirmed. In this mode, the pictures or objects can be optionally arranged on the editing-display area CEA, as mentioned in detail hereinafter.

The mode setting button DLM serves as an object-deleting-mode button. When the button DLM is operated by clicking on it with the mouse, an object-deleting mode is set. Similarly, the operated button DLM is displayed as if being depressed, whereby the setting of the object-deleting mode can be visually confirmed. In this mode, the pictures or objects can be deleted from the editing-display area CEA, and the deleted objects can be again displayed on the picture-display area GDA.

Note, in FIG. 8, the operated button ARM is hatched so as to be distinguished from the non-operated buttons MVM and DLM.

In the object-transferring/connecting mode (ARM), for example, when the object OB1 is indicated by clicking on it with the mouse, the object OB1 is encompassed by a single-dot-line frame, as shown in FIG. 8, whereby the object OB1 is visually distinguished from the remaining objects OB2 and OB3. Then, when the pointer (not shown) is moved in the editing-display area CEA by manipulating the mouse, a broken-line frame GM is displayed on the editing-display area CEA such that the pointer is surrounded by the broken-line frame GM. When the pointer is moved within the editing-display area CEA by manipulating the mouse, the pointer takes with it the broken-line frame GM. Thus, the broken-line frame GM can be positioned at a given location by the pointer. After the positioning of the broken-line frame GM, when a clicking operation is performed with the mouse, all the objects OB1, OB2 and OB3 are once transferred from the picture-display area GDA to the editing-display area CEA, as shown in FIG. 9.

The transferred objects OB1, OB2 and OB3 are connected to each other in the photographing order by connecting-strips CNS displayed on the editing-display area CEA, whereby it is possible to visually recognize the relationship between the objects OB1, OB2 and OB3. Each of the displayed connecting-strips CNS behaves just like a rubber strip connected between the centers of the two adjacent objects (OB1 and OB2 or OB2 and OB3) at the back faces thereof. Namely, for example, if the object OB1 is moved apart from the remaining objects OB2 and OB3 in the object-arranging mode, the connecting-strip CNS is displayed as being extended between the centers of the objects OB1 and OB2.

Figure 9:
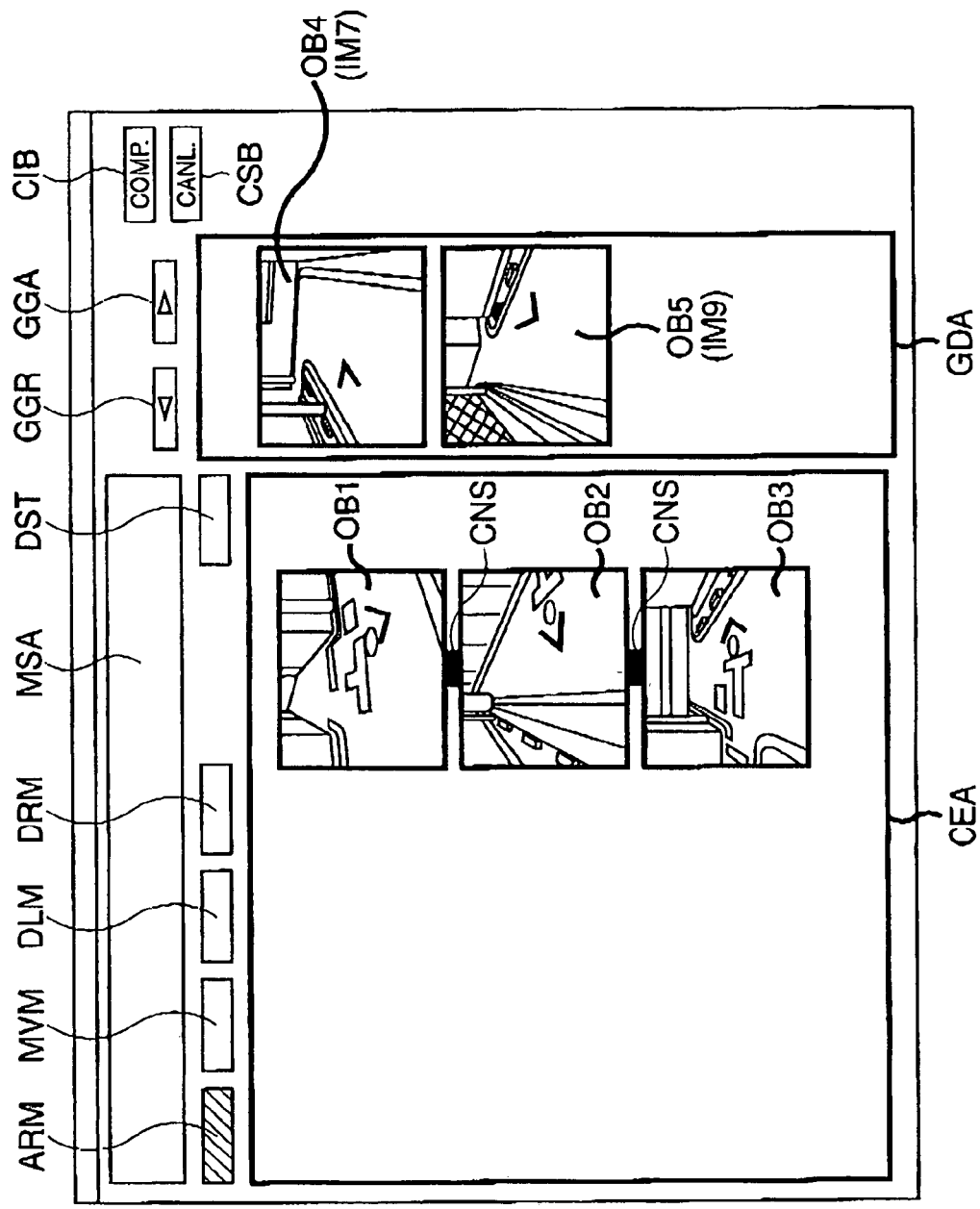
FIG. 9 is a view, similar to FIG. 8, showing the connection-mode scene at an aspect different from FIG. 8.

In the scene of FIG. 9, as mentioned above, when the object-deleting button DLM is operated by clicking on it with the mouse, the object-deleting mode is selected. In this mode, when one of the objects OB1, OB2 and OB3 is indicated by clicking on it with the mouse, all the objects OB1, OB2 and OB3 are deleted from the editing-display area CEA, and are then displayed on the picture-display area GDA. Namely, the scene of FIG. 9 in returned to the scene as shown in FIG. 8.

As shown in FIG. 9, as soon as the transfer of the objects OB1, OB2 and OB3 from the picture-display area GDA to the editing-display area CEA is performed, the part of the pictures included in the second group is displayed on the picture-display area GDA, regardless of the operation of the advancing button GGA. Namely, the objects OB4 and OB5, which correspond to the pictures IM7 and IM9 obtained at the photographing positions M7 and M9, respectively, are displayed on the picture-display area GDA. Of course, image data for the objects OB4 and OB5 are produced on the basis of the seventh and ninth frames of image data read from the memory card 13, and are stored in the display memory 20.

The objects OB4 and OB5 (IM7 and IM9) are based on the target TG being located at the second target position RP2. Thus, before the objects OB4 and OB5 can be connected to the objects OB1, OB2 OB3 based on the target TG being located at the first target position RP1, it is necessary to execute a processing for transforming the second scene coordinate system $(X_S'-Y_S'-Z_S')$ into the first scene coordinate system $(X_S-Y_S-Z_S)$.

Figure 10:
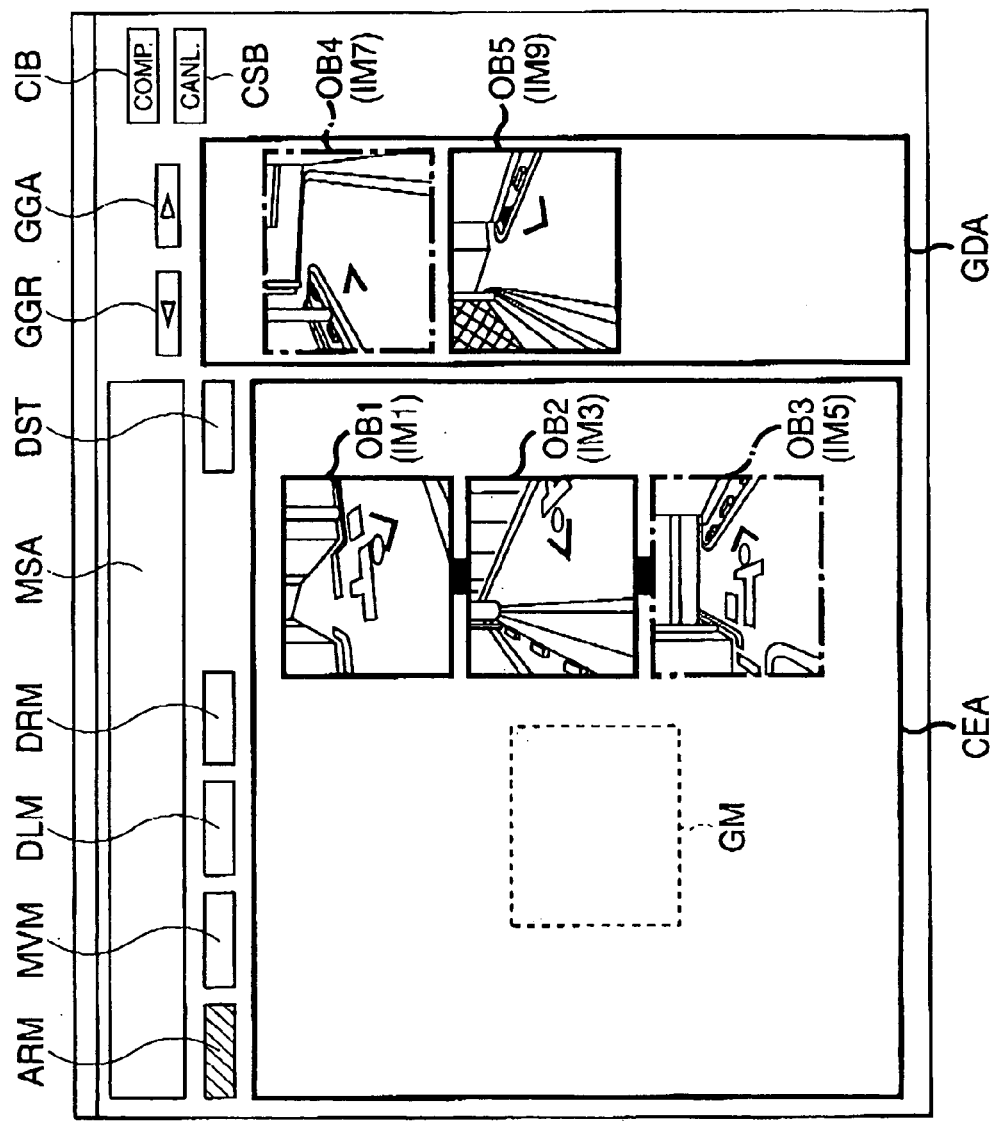
FIG. 10 is a view, similar to FIG. 8, showing the connection-mode scene at another aspect different from FIG. 8.

For the transformation of the second scene coordinate system into the first scene coordinate system, one of the objects OB4 and OB5 and one of the objects OB1, OB2 and OB3 to be connected to each other are selected. For example, as shown in FIG. 10, the objects OB4 and OB3 to be connected to each other are selected, and the selection of each object (OB4, OB3) is performed by clicking on it with the mouse, whereby each of the selected objects OB4 and OB3 are encompassed by a single-dot-line frame, as shown in FIG. 10. Then, when the pointer is moved in the editing-display area CEA by manipulating the mouse, a broken-line frame GM appears on the editing-display area CEA (FIG. 10), with the pointer indicating the center of the broken-line frame GM. After the broken-line frame GM is positioned at a given location by the pointer, when a clicking operation is performed with the mouse, the scene (FIG. 10) of the monitor 10 is changed into a scene as shown in FIG. 11.

Figure 11:
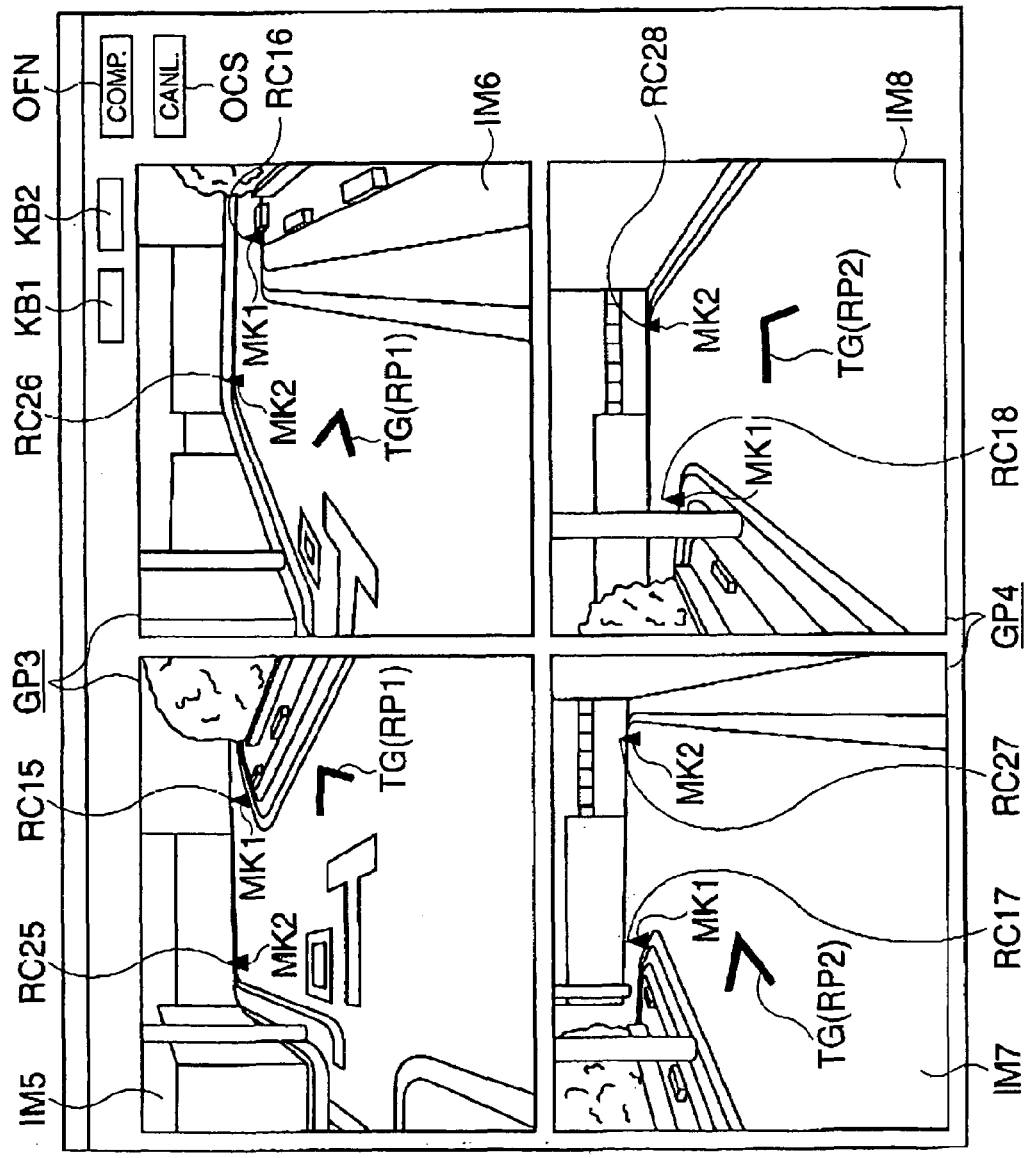
FIG. 11 is a view of a scene changed from the connection-mode scene of the monitor shown in FIG. 10.

On the scene of FIG. 11, the third pair of pictures IM5 and IM6 and the fourth pair of pictures IM7 and IM8 are displayed. Of course, the third pair of pictures IM5 and IM6 are obtained at the photographing positions M5 and M6, and are based on the target TG being located at the first target position RP1, and the fourth pair of pictures IM7 and IM8 are obtained at the photographing positions M7 and M8, and are based on the target TG being located at the second target position RP2.

As shown in FIG. 11, the respective connection points RC1 and RC2 of the cone-shaped markers MK1 and MK2 (FIG. 1) are displayed as image points RC15 and RC25 on the picture IM5, and are displayed as image points RC16 and RC26 on the picture IM6. Also, the respective connection points RC1 and RC2 of the cone-shaped markers MK1 and MK2 are displayed as image points RC17 and RC27 on the picture IM7, and are displayed as image points RC18 and RC28 on the picture IM8.

Also, on the scene of the monitor 10 shown in FIG. 11, a first designation button KB1, a second designation button KB2, a completion button OFN and a cancel button OCS are displayed.

When the first designation button KB1 is operated by clicking on it with the mouse, a first designation mode is selected to designate the image points RC15, RC16, RC17 and RC18. In the first designation mode, when the image points RC15 and RC16 are consecutively designated by clicking on them with the mouse, three-dimensional coordinates of the connection point RC1 are calculated with respect to the first scene coordinate system $(X_S-Y_S-Z_S)$. Also, when the image points RC17 and RC18 are consecutively designated by clicking on them with the mouse, three-dimensional coordinates of the connection point RC1 are calculated with respect to the second scene coordinate system $(X_S'-Y_S'-Z_S')$.

When the second designation button KB2 is operated by clicking on it with the mouse, a second designation mode is selected to designate the image points RC25, RC26, RC27 and RC28. In the second designation mode, when the image points RC25 and RC26 are consecutively designated by clicking on them with the mouse, three-dimensional coordinates of the connection point RC2 are calculated with respect to the first scene coordinate system $(X_S-Y_S-Z_S)$. Also, when the image points RC27 and RC28 are consecutively designated by clicking on them with the mouse, three-dimensional coordinates of the connection point RC2 are calculated with respect to the second scene coordinate system $(X_S'-Y_S'-Z_S')$.

Thus, it is possible to determine not only a relative movement distance of the target TG from the first target position RP1 to the second target position RP2 but also a relative rotational angle of the second scene coordinate system $(X_S'-Y_S'-Z_S')$ with respect to the first scene coordinate system $(X_S-Y_S-Z_S)$. Of course, the determined movement distance and the determined rotational angle represent the coordinates $(X_{dp}, Z_{dp})$ and the angle of $\xi$, respectively, as explained with reference to FIG. 7. In short, by the designation of the ge points (RC15, RC16, RC17 and RC18; and RC25, RC26, RC27 and RC28), the transformation of the second scene coordinate system $(X_S'-Y_S'-Z_S')$ into the first scene coordinate system $(X_S-Y_S-Z_S)$ is performed on the basis of the above-mentioned formula (4), whereby the photographing positions M7, M8, M9 and M10 are expressed with respect to the first scene coordinate system $(X_S-Y_S-Z_S)$, resulting in connection between the first group of pictures (IM1 to IM6) and the second group of pictures (IM7 to IM10).

Figure 12:
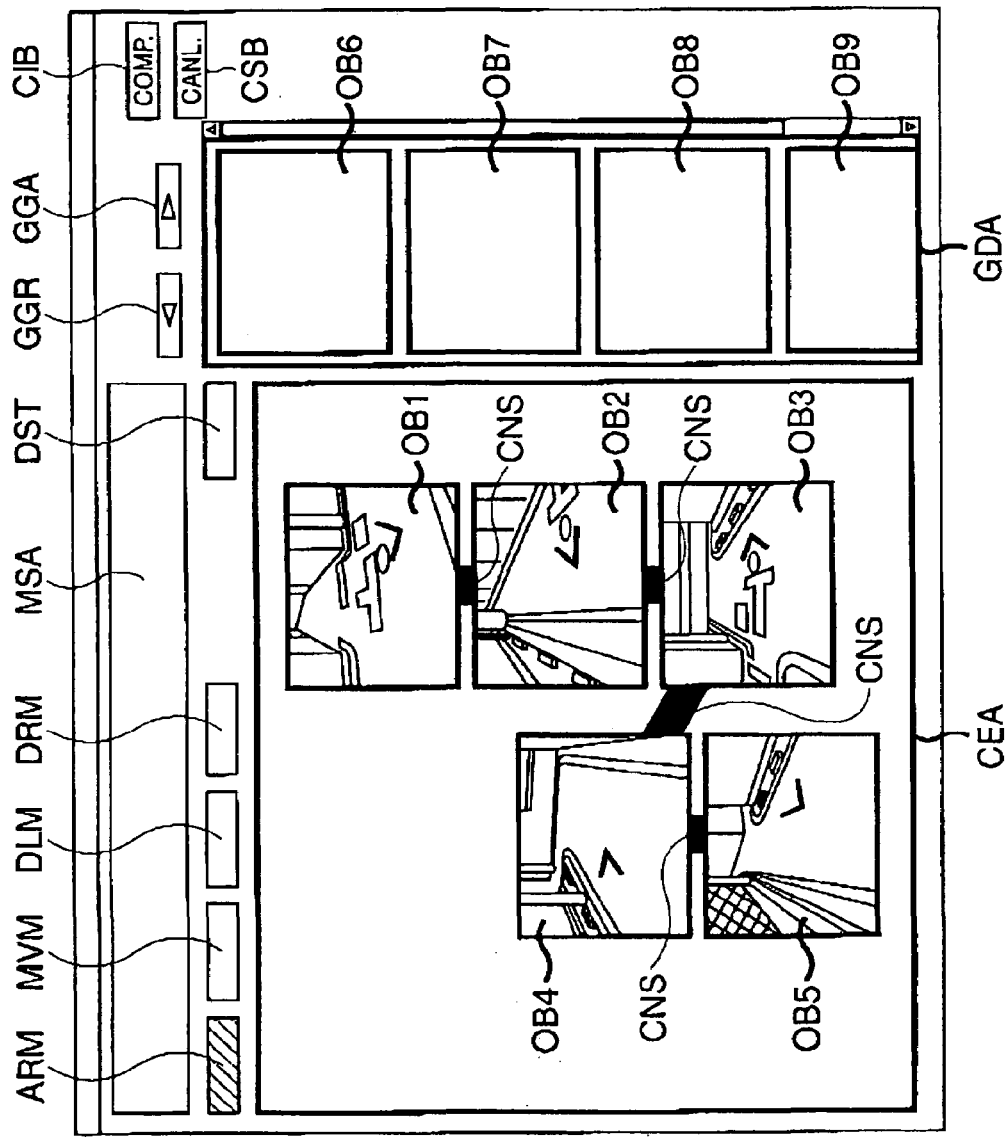
FIG. 12 is a view, similar to FIG. 8, showing the connection-mode scene at yet another aspect different from FIG. 8.

After the designation of the image points (RC15, RC16, RC17 and RC18; and RC25, RC26, RC27 and RC28), the completion button OFN is operated by clicking on it with the mouse, the scene (FIG. 11) of the monitor 10 is changed into a scene as shown in FIG. 12. As is shown in this drawing, the objects OB4 and OB5 are transferred from the picture-display area GDA to the editing-display area CEA, and the objects OB4 and OB5 are successively connected to the object OB3, included in the first group, by connecting-strips CNS.

In the scene of FIG. 11, when it is perceived that the designation of a pair of image points (RC15 and RC16; RC17 and RC18; RC25 and RC26; RC27 and RC28) is erroneously performed, the designation concerned is canceled by operating the cancel button OCS by clicking on it with the mouse. Thereafter, the designation can be tried again.

As shown in FIG. 12, as soon as the transfer of the objects OB4 and OB5 from the picture-display area GDA to the editing-display area CEA is performed, the part of the pictures included in the third group is displayed on the picture-display area GDA, regardless of the operation of the advancing button GGA. Namely, the objects OB6, OB7, OB8 and OB9, which correspond to the pictures IM11, IM13, IM15 and IM17 obtained at the photographing positions M11, M13, M15 and M17, respectively, are displayed on the picture-display area GDA. Of course, image data for the objects OB6, OB7, OB8 and OB9 are produced on the basis of the eleventh, thirteenth, fifteenth and seventeenth frames of image data read from the memory card 13, and are stored in the display memory 20.

Figure 13:
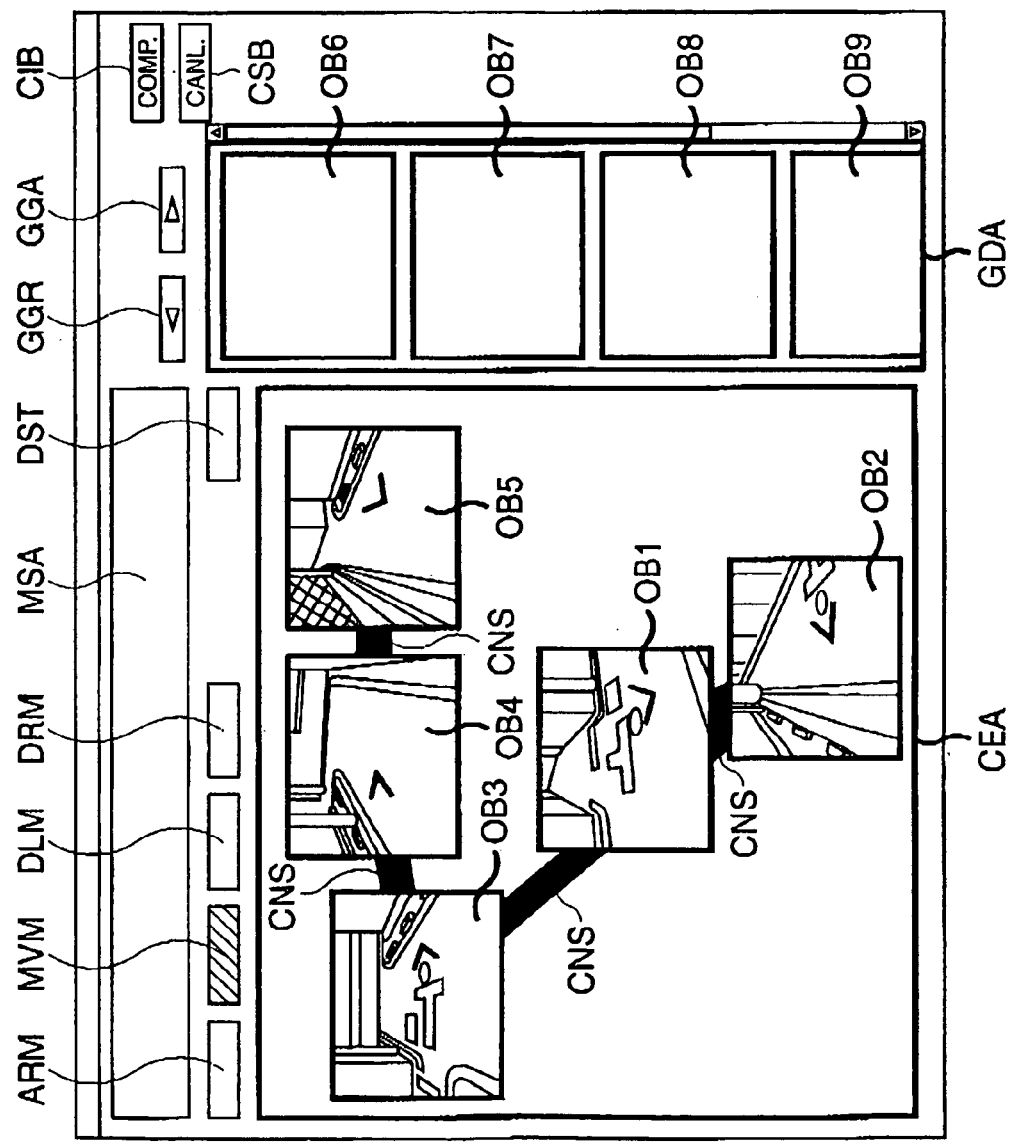
FIG. 13 is a view, similar to FIG. 8, showing the connection-mode scene at yet further another aspect different from FIG. 8.

Note, in FIGS. 12 and 13, each of the objects OB6, OB7, OB8 and OB9 is shown as a blank frame for the sake of convenience.

Similar to the above-mentioned cases, the objects OB6, OB7, OB8 and OB9 can be transferred from the picture-display area GDA to the editing-display area CEA, and can be connected to the second group of the objects in substantially the same manner as explained above with respect to the objects OB4 and OB5 included in the second group.

For example, in the scene of the FIG. 12, when the object-arranging mode is selected by operating the object-arranging-mode button MVM by clicking on it with the mouse, the objects OB1, OB2, OB3, OB4 and OB5, connected to each other by the connecting-strips CNS, can be optionally rearranged on the editing-display area CEA, as shown in FIG. 13 in which the operated button MVM is hatched to indicate the setting of the object-arranging mode.

In particular, when one of the objects OB1, OB2, OB3, OB4 and OB5 is indicated by clicking on it with the mouse, the indicated object is encompassed by a single-dot-line frame, just like the object OB4 shown in FIG. 10. Then, when the pointer (not shown) is out of the indicated object, a broken-line frame (GM), as shown in FIG. 8 or 10, is displayed on the editing-display area CEA such that the pointer is surrounded by the broken-line frame (GM). When the pointer is moved within the editing-display area CEA by manipulating the mouse, the pointer takes with it the broken-line frame (GM). Thus, the broken-line frame (GM) can be positioned at a given location by the pointer. After the positioning of the broken-line frame (GM), when a clicking operation is performed with the mouse, the indicated object is moved from an original position shown in FIG. 12 to a new position shown in FIG. 13. In this way, the objects OB1, OB2, OB3, OB4 and OB5 shown in FIG. 12 can be rearranged as shown in FIG. 13.

In short, the objects can be optionally arranged on the editing-display area CEA in accordance with an operator's taste or choice. For example, the rearrangement of the objects are performed such that the operator or-photographer can be easily reminded of the photographing scenes, resulting in facilitation of the production of the survey map.

Note, it is apparent from FIG. 13 that each of the displayed connecting-strips CNS behave just like a rubber strip connected between the centers of the two adjacent objects at the back faces thereof when each of the objects is moved.

Also, note, of course, in the scene of FIG. 9, when the object-arranging mode is set, it is possible to rearrange the objects OB1, OB2 and OB3.

In the scene of FIG. 12 or 13, when one of the objects OB1, OB2 and OB3 is indicated by clicking on it with the mouse in the object-deleting mode (DLM), all the objects OB1, OB2 and OB3 are deleted from the editing-display area, and are then returned to the picture-display area GDA. Similarly, when one of the objects OB4 and OB5 is indicated by clicking on it with the mouse, both the objects OB4 and OB5 are deleted from the editing-display area CEA, and are then returned to the picture-display area GDA.

The first group of objects OB1, OB2 and OB3, the second group of objects OB4 and OB5, and the third objects OB6, OB7, OB8 and OB9 are displayed on only one of the picture-display area GDA and the editing-displayed area CEA. Namely, each of the first, second and third groups cannot be simultaneously displayed on both the picture-display area GDA and the editing-displayed area CEA.

For this end, a GDA-list memory area and a CEA-list memory area are defined in the working memory 19. Respective object-numbers "1" to "9", which represent the objects OB1 to OB9 are initially stored in the GDA-list memory area, whereby the first, second and third groups of objects (OB1, OB2 and OB3; OB4 and OB5; and OB6, OB7, OB8 and OB9) are enabled to be selectively displayed on the picture-display area GDA, as explained with reference to FIG. 8. On the other hand, the CEA-list memory area are initially cleared, whereby the first, second and third groups of objects cannot be displayed on the editing-display area CEA.

For example, when the first group of objects OB1, OB2 and OB3 are transferred from the picture-display area GDA to the editing-display area CEA, the object-numbers "1", "2" and "3" are cleared from the GDA-list memory area, and the cleared object-numbers "1", "2" and "3" are added to the CEA-list memory area, whereby the first group of objects OB1, OB2 and OB3 are enabled to be displayed on the editing-display area CEA, but cannot be displayed on the picture-display area GDA. On the contrary, when the first group of objects OB1, OB2 and OB3 are returned from the editing-display area CEA to the picture-display area GDA, the object-numbers "1", "2" and "3" are cleared from the CEA-list memory area, and the cleared object-numbers "1", "2" and "3" are added to the GDA-list memory area. Of course, this is true for the second and third groups of objects (OB4 and OB5; and OB6, OB7, OB8 and OB9).

The scenes of the monitor 10, shown in FIGS. 8, 9, 10, 12 and 13, include a setting-menu-display area MSA which is associated with a setting-alteration button DST and a setting-fixing button DRM displayed thereon. When the button DST is operated by clicking on it with the mouse, various setting-menus are displayed on the setting-menu-display area MSA. Among the setting-menus, for example, there are a size-altering menu for altering a size of an object (OB1 to OB9) or picture (IM1 to IM18) to be displayed, and a connecting-strip-altering menu for altering a width, a color or the like of a connecting-strip (CNS) to be displayed. Each of the setting-menus has various setting-items, and an alteration of a setting is performed by indicating a corresponding setting-item by clicking on it with the mouse. After the alteration of the setting is completed, when the setting-fixing button DRM is operated by clicking on it with the mouse, the alteration of the setting is fixed, and the setting-menus disappear from the setting-menu-display area MSA.

Further, on the scenes shown in FIGS. 8, 9, 10, 12 and 13, a completion button CIB and a cancel button CSB are displayed. After the objects (OB1 to OB9) are successively connected to each other, when the completion button CIB is operated by clicking on it with the mouse, the connection data between the objects (OB1 to OB9) are stored in a suitable memory medium (not shown), such as a hard disc, provided in the image processing computer system, and the connection-mode scene of the monitor 10 is returned to the initial menu scene. Also, whenever the cancel button CSB is operated by clicking on it with the mouse, a processing concerned for connecting objects to each other is canceled.

Figure 14:
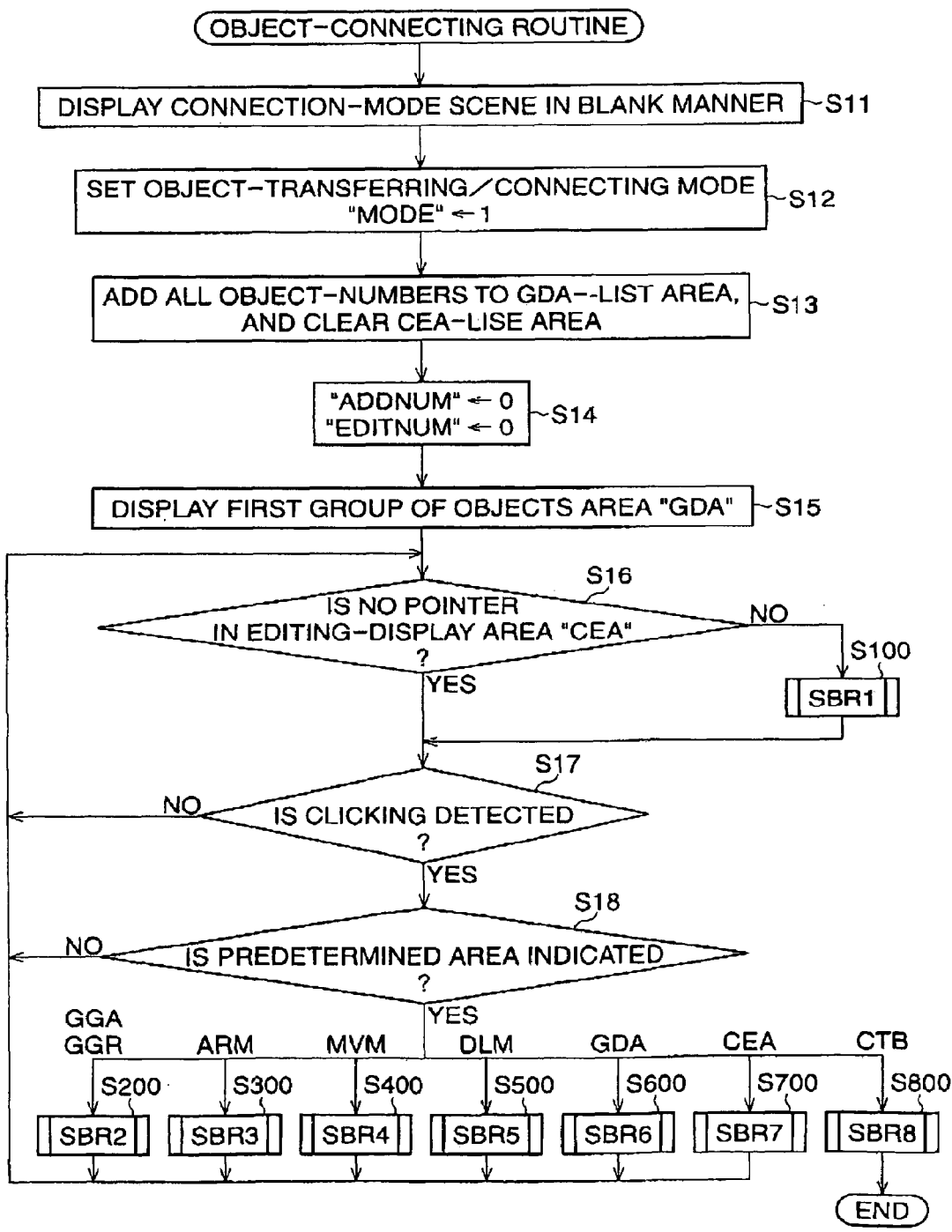
FIG. 14 is a flowchart for an object-connecting routine executed in the photogrammetric image processing computer system according to the present invention.

FIG. 14 shows a flowchart for an object-connecting routine, which is executed when the connection-mode scene is selected from the initial menu scene of the monitor 10, as shown in FIG. 8. Note, when an execution of the object-connecting routine is started, the above-mentioned spatial determination of the photographing positions M1 to M18 is already completed.

At step S11, the connection-mode scene is displayed on the monitor 10 in a blank manner such that no objects are displayed on the picture-display area GDA and the editing-display area CEA. Then, at step S12, a variable "MODE" is made to be "1", whereby the object-transferring/connecting mode is set on the connection-mode scene of the monitor 10, because the object-transferring/connecting mode is forcibly set when the connection-mode scene is selected from the initial menu scene of the monitor 10, as mentioned above. Namely, when the variable "MODE" is "1", it indicates the setting of the object-transferring/connecting mode on the connection-mode scene.

Note, when the object-arranging-mode button MVM is operated by clicking on it with the mouse, the object-arranging mode is set, whereby the variable "MODE" is made to be "2", and, when the object-deleting-mode button DLM is operated by clicking on it with the mouse, the object-deleting mode is set, whereby the variable "MODE" is made to be "3".

At step S13, all the object-numbers "1" to "9", which represent the objects OB1 to OB9, respectively, are added to the GDA-list memory area defined in the working memory 19, and the CEA-list memory area defined in the working memory 19 is cleared.

At step S14, variables "ADDNUM" and "EDITNUM" are reset to be "0". The variable "ADDNUM" is used to represent whether one of the objects, displayed on the picture-display area GDA, is indicated by clicking on it with the mouse. When the indication of an object on the picture-display area GDA is confirmed, the variable "ADDNUM" is made to be an object-number corresponding to the indicated object. For example, as shown in FIG. 8, when the object OB1 is indicated by clicking on it with the mouse, the variable "ADDNUM" is made to be "1". The variable "EDITNUM" used to represent whether one of the objects, displayed on the editing-display area CEA, is indicated by clicking on it with the mouse. When the indication of an object on the editing-display area CEA is confirmed, the variable "EDITNUM" is made to be an object-number corresponding to the indicated object. For example, as shown in FIG. 10, the object OB3 is indicated by clicking on it with the mouse, the variable "EDITNUM" is made to be "3".

At step S15, the first group of objects OB1, OB2 and OB3 is displayed on the picture-display area GDA in accordance with the object-numbers listed on the GDA-list memory area. Thus, the scene of the monitor 10 corresponds to one as shown in FIG. 8 except that the broken-line frame GM is displayed on the editing-display area CEA.

At step S16, it is monitored whether the pointer is entered into the editing-display area CEA by manipulating the mouse. When the pointer is in the editing-display area CEA, the control proceeds to step S100, in which a subroutine SBR1 is executed. The subroutine SBR1 is to manage a display of the broken-line frame GM on the editing-display area CEA. Note, the subroutine SBR1 is explained in detail with reference to FIG. 15 hereinafter.

At step S16, when the pointer is not in the editing-display area CEA, the control proceeds to step S17, in which it is monitored whether a clicking operation is performed with the mouse. When the clicking operation is not confirmed, the control returns to step S16.

At step S17, when the clicking operation is confirmed, the control proceeds to step S18, in which it is determined whether a predetermined area is indicated by the pointer during the performance of the clicking operation.

At step S18, when the predetermined area, indicated by the pointer, is either the advancing button GGA or the returning button GGR, the control proceeds to step S200, in which a subroutine SBR2 is executed. Note, the subroutine SBR2 is explained in detail with reference to FIG. 16 hereinafter.

At step S11, when the predetermined area, indicated by the pointer, is the object-transferring/connecting-mode button ARM, the control proceeds to step S300, in which a subroutine SBR3 is executed. Note, the subroutine SBR3 is explained in detail with reference to FIG. 17 hereinafter.

At step S18, when the predetermined area, indicated by the pointer, is the object-arranging-mode button MVM, the control proceeds to step S400, in which a subroutine SBR4 is executed. Note, the subroutine SBR4 is explained in detail with reference to FIG. 18 hereinafter.

At step S18, when the predetermined area, indicated by the pointer, is the object-deleting-mode button DLM, the control proceeds to step S500, in which a subroutine SBR5 is executed. Note, the subroutine SBR5 is explained in detail with reference to FIG. 19 hereinafter.

At step S18, when the predetermined area, indicated by the pointer, is the picture-display area GDA, the control proceeds to stop S600, in which a subroutine SBR6 is executed. Note, the subroutine SBR6 is explained in detail with reference to FIG. 20 hereinafter.

At step S18, when the predetermined area, indicated by the pointer, is the editing-display area CEA, the control proceeds to step S700, in which a subroutine SBR7 is executed. Note, the subroutine SBR7 is explained in detail with reference to FIG. 21 hereinafter.

At step S18, when the predetermined area, indicated by the pointer, is the completion button CIB, the control proceeds to step S800, in which a subroutine SBR8 is executed. Note, the subroutine SBR8 is explained in detail with reference to FIG. 22 hereinafter.

Note, at step S18, when it is not confirmed that any one of the predetermined areas is indicated by the pointer during the performance of the clicking operation, the control returns to step S16.

FIG. 15 shows a flowchart for the subroutine SBR1 executed at step S100 of the object-connecting routine shown in FIG. 14. Of course, the execution of the subroutine SBR1 is started when the clicking operation is performed provided that the pointer is in the editing-display area CEA.

At step S101, it is determined whether a broken-line frame GM is displayed on the editing-display area CEA. When the broken-line frame GM is not displayed on the editing-display area CEA, the subroutine SBR1 once ends.

Note, as mentioned above, the broken-line frame GM is not displayed on the editing-display area CEA until an object is indicated by clicking on it with the mouse in either the picture-display area GDA or the editing-display area CEA, and an initial display of the broken-line frame GM is explained hereinafter.

At step S101, when a broken-line frame GM is displayed on the editing-display area CEA, the control proceeds to stop S102, in which the broken-line frame GM is eliminated from the editing-display area CEA. Then, at step S103, a new broken-line frame GM is displayed on the editing-display area CEA. The routine comprising steps S102 and S103 is repeated as long as the pointer is in the editing-display area CEA, whereby it is observed that the broken-line frame GM is moved together with the pointer in the editing-display area CEA.

FIG. 16 shows a flowchart for the subroutine SBR2 executed at step S200 of the object-connecting routine shown in FIG. 14. Of course, the execution of the subroutine SBR2 is started when the clicking operation is performed provided that either the advancing button GGA or the returning button GGR is indicated by the pointer.

At step S201, it is determined whether the advancing button GGA is operated by clicking on it with the mouse. When the operation of the advancing button GGA is confirmed, the control proceeds to step S202, in which a next group of objects is displayed on the picture-display area GDA. Then, at step S203, both the variables "ADDNUM" and "EDITNUM" are reset to be "0". Note, when the advancing button GGA is operated while the last or third group of objects OB6, OB7, OB8 and OB9 is displayed on the picture-display area GDA, the first group of objects OB1, OB2 and OB3 is displayed on the area GDA as the next group of objects.

At step S201, when the advancing button GGA is not operated, i.e. when the returning button GGR is operated, the control proceeds to step S204, in which a preceding group of objects is displayed on the picture-display area GDA. Then, at step S203, both the variables "ADDNUM" and "EDITNUM" are reset to be "0". Note, when the returning button GGR is operated while the first group of objects OB1, OB2 and OB3 is displayed on the picture-display area GDA, the third group of objects OB6, OB7, OB6 and OB9 is displayed on the area GDA as the preceding group of objects.

Figure 17:
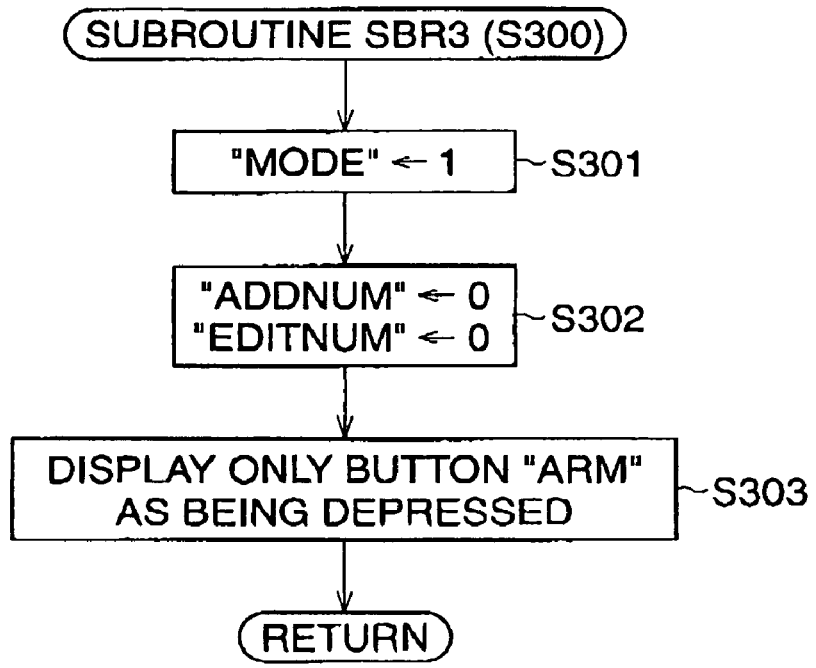
FIG. 17 is a flowchart for a subroutine executed in step S300 of the object-connecting routine of FIG. 14.

FIG. 17 shows a flowchart for the subroutine SBR3 executed at step S300 of the object-connecting routine shown in FIG. 14. Of course, the execution of the subroutine SBR3 is started when the clicking operation is performed provided that the pointer is on the object-transferring/connection button ARM.

At step S301, the variable "MODE" is made to be "1", and, at stop S302, both the variables "ADDNUM" and "EDITNUM" are reset to be "0". Then, at step S303, only the object-transferring/connecting-mode button ARM is displayed as if being depressed, thereby indicating the setting of the object-transferring/connecting mode.

Figure 18:
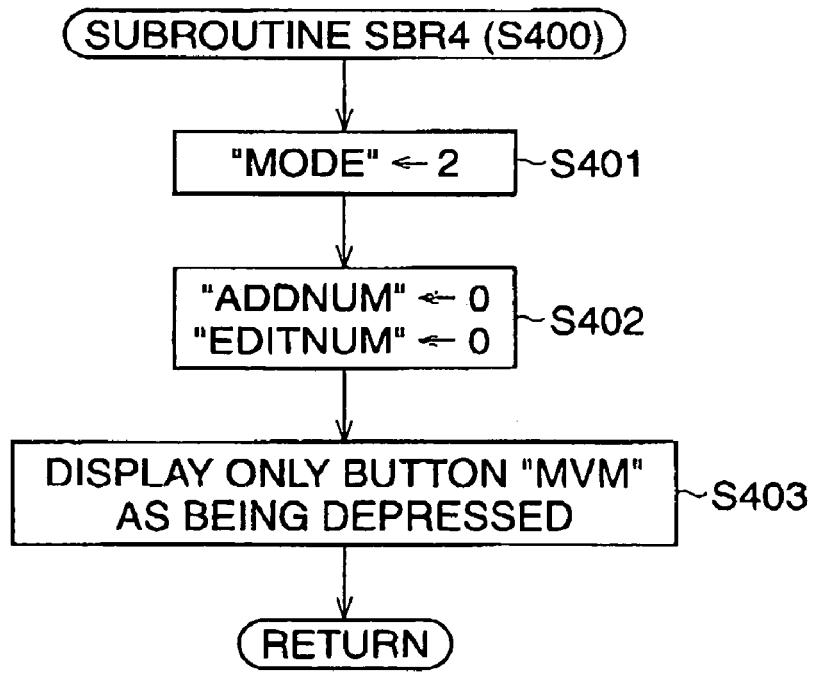
FIG. 18 is a flowchart for a subroutine executed in step S400 of the object-connecting routine of FIG. 14.

FIG. 18 shows a flowchart for the subroutine SBR4 executed at step S400 of the object-connecting routine shown in FIG. 14. Of course, the execution of the subroutine SBR4 is started when the clicking operation is performed provided that the object-arranging button MVM is indicated by the pointer.

At step S401, the variable "MODE" is made to be "2", and, at step S402, both the variables "ADDNUM" and "EDITNUM" are reset to be "0". Then, at step S403, only the object-arranging-mode button MVM is displayed as if being depressed, thereby indicating the setting of the object-arranging mode.

Figure 19:
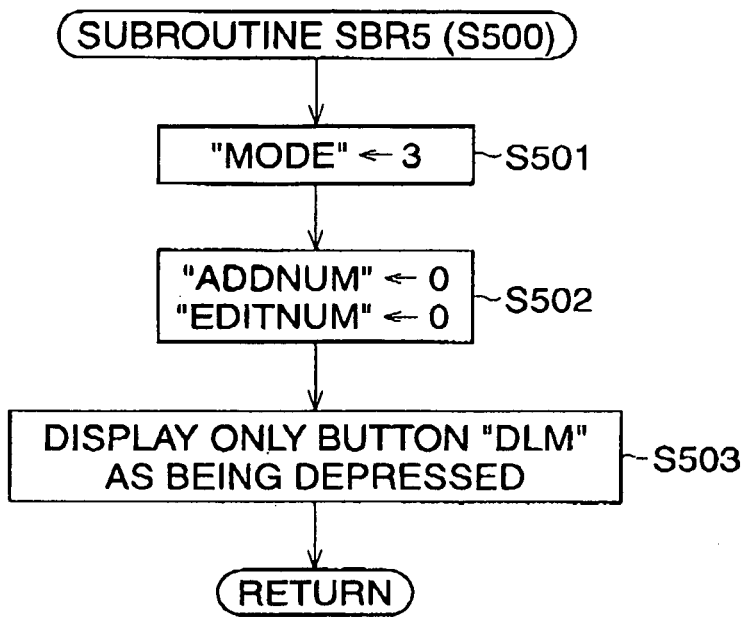
FIG. 19 is a flowchart for a subroutine executed in step S500 of the object-connecting routine of FIG. 14.

FIG. 19 shows a flowchart for the subroutine SBR5 executed at step S500 of the object-connecting routine shown in FIG. 14. Of course, the execution of the subroutine SBR5 is started when the clicking operation is performed provided that the object-deleting button DLM is indicated by the pointer.

At step S501, the variable "MODE" is made to be "3", and, at step S502, both the variables "ADDNUM" and "EDITNUM" are reset to be "0". Then, at step S503, only the object-deleting-mode button DLM is displayed as if being depressed, thereby indicating the setting of the object-deleting mode.

Figure 20:
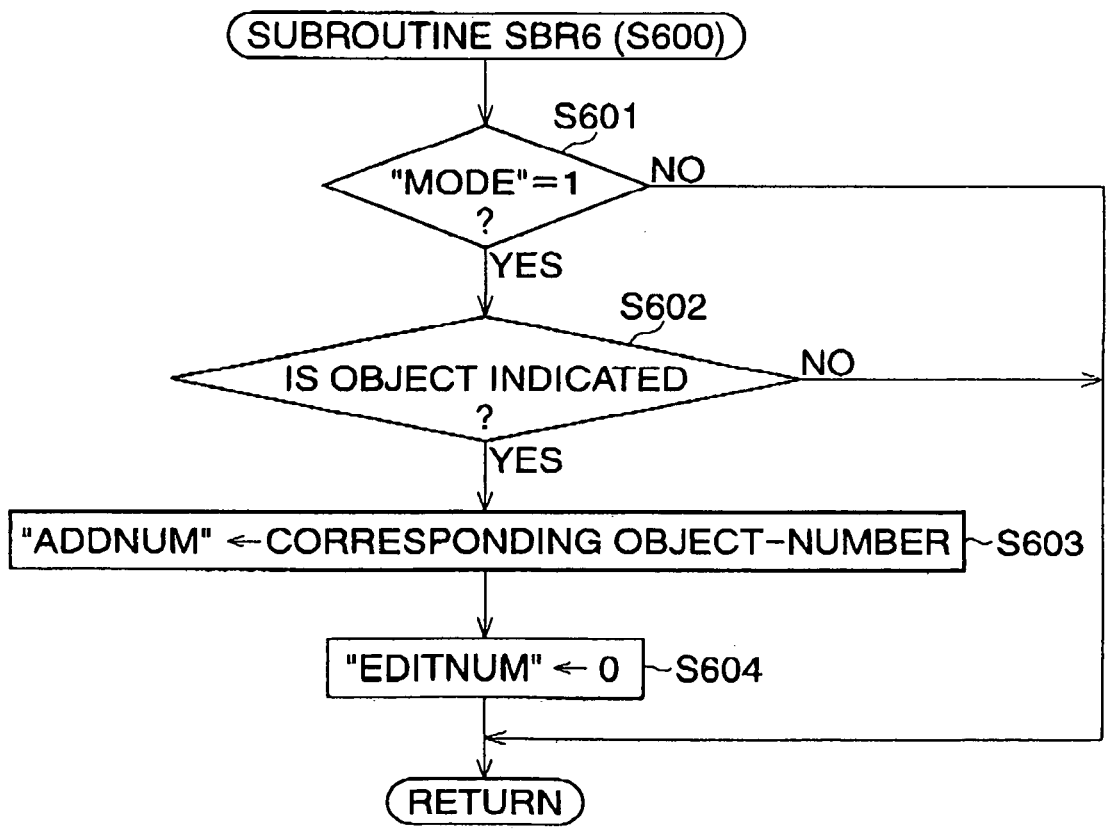
FIG. 20 is a flowchart for a subroutine executed in step S600 of the object-connecting routine of FIG. 14.

FIG. 20 shows a flowchart for the subroutine SBR6 executed at step S600 of the object-connecting routine shown in FIG. 14. Of course, the execution of the subroutine SBR6 is started when the clicking operation is performed provided that the pointer is in the picture-display area GDA.

At step S601, it is determined whether the variable "MODE" is "1", i.e. whether the object-transferring/connecting mode is selected. If MODE ≠1, the subroutine SBR6 once ends. Namely, the clicking operation is ignored when the object-transferring/connecting mode is not selected.

At step S601, when it is confirmed that the object-transferring/connecting mode is selected (MODE=1), the control proceeds to step S602, in which it is determined whether the clicking operation is performed provided that any one of the objects displayed on the picture-display area GDA is indicated by the pointer. If the pointer is out of the object displayed on the area GDA, the subroutine SBR6 once ends. Namely, the clicking operation is ignored when the pointer is out of the object displayed on the area GDA.

At step S602, when it is confirmed that the clicking operation is performed provided that the object is indicated by the pointer, the control proceeds to step S603, in which the variable "ADDNUM" is set to be an object-number corresponding to the indicated object. For example, as shown in FIG. 8, when the object OB1 is indicated by clicking on it with the mouse, the variable "ADDNUM" is set to be "1". Then, at step S604, the variable "EDITNUM" is reset to be "0".

Figure 21:
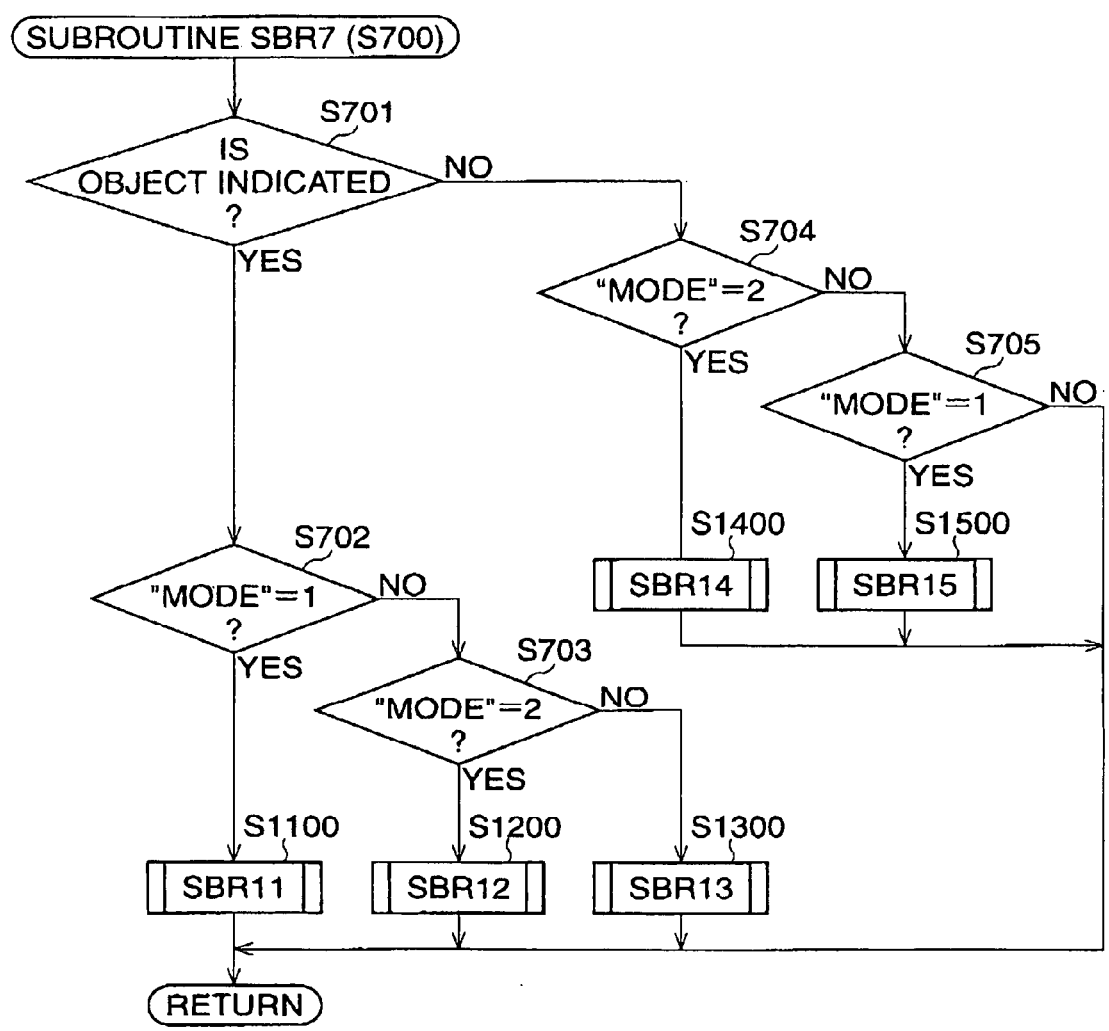
FIG. 21 is a flowchart for a subroutine executed in step S700 of the object-connecting routine of FIG. 14.

FIG. 21 shows a flowchart for the subroutine SBR7 executed at step S700 of the object-connecting routine shown in FIG. 14. Of course, the execution of the subroutine SBR7 is started when the clicking operation is performed provided that the pointer is in the editing-display area CEA.

At step S701, it is determined whether the clicking operation is performed provided that any one of the objects, displayed on the editing-display area CEA, is indicated by the pointer. When it is confirmed that the clicking operation is performed provided that the object is indicated by the pointer, the control proceeds to step S702, in which it in determined whether the variable "MODE" is "1". If MODE=1, i.e. if the object-transferring/connecting mode is selected, the control proceeds to step S1100, in which a subroutine SBR11 is executed. Note, the subroutine SBR11 is explained in detail with reference to FIG. 23 hereinafter.

At step S702, if MODE ≠1, the control proceeds to step S703, in which it is determined whether the variable "MODE" is "2". If MODE=2, i.e. if the object-arranging mode is selected, the control proceeds to step S1200, in which a subroutine SBR12 is executed. Note, the subroutine SBR12 is explained in detail with reference to FIG. 24 hereinafter.

At step S703, if MODE ≠2, i.e. if the object-deleting mode is selected (MODE=3), the control proceeds to step S1300, in which a subroutine SBR13 is executed. Note, the subroutine SBR13 is explained in detail with reference to FIG. 25 hereinafter.

On the other hand, at step S701, when it is confirmed that the clicking operation is performed provided that the object is not indicated by the pointer, the control proceeds to step S704, in which it is determined whether the variable "MODE" is "2". If MODE=2, i.e. if the object-arranging mode is selected, the control proceeds to step S1400, in which a subroutine SBR14 is executed. Note, the subroutine SBR14 is explained in detail with reference to FIG. 26 hereinafter.

At step S704, if MODE ≠2, the control proceeds to step S705, in which it is determined whether the variable "MODE" is "1". If MODE=1, i.e. if the object-transferring/ connecting mode is selected, the control proceeds to step S1500, in which a subroutine SBR15 is executed. Note, the subroutine SBR15 is explained in detail with reference to FIG. 27 hereinafter.

At step S705, if MODE ≠1, i.e. if the object-deleting mode is selected (MODE=3), the subroutine SBR7 once ends. Namely, in the object-deleting mode, the clicking operation, which is performed provided that the pointer is out of the object, is ignored.

Figure 22:
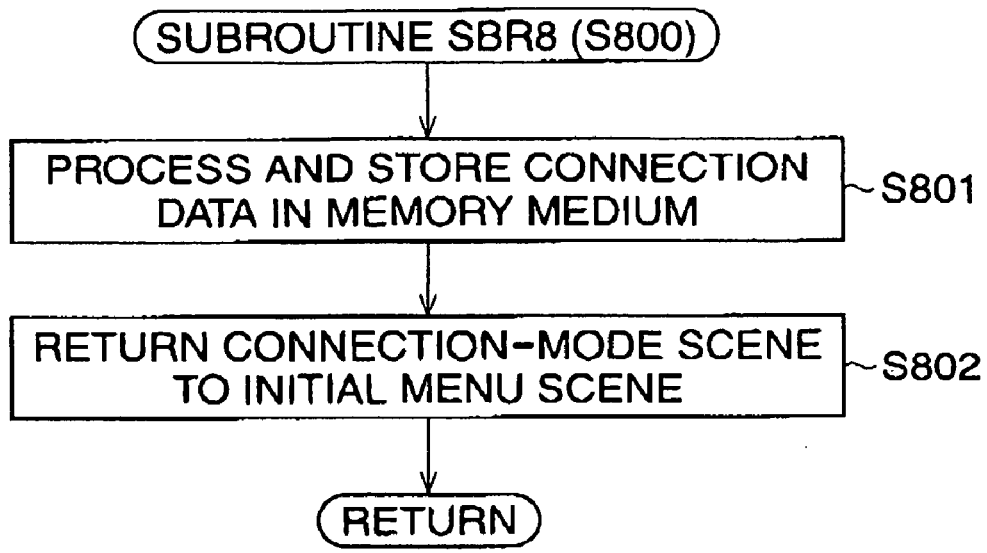
FIG. 22 is a flowchart for a subroutine executed in step S800 of the object-connecting routine of FIG. 14.

FIG. 22 shows a flowchart for the subroutine SBR8 executed at step S800 of the object-connecting routine shown in FIG. 14. Of course, the execution of the subroutine SBR8 is started when the clicking operation is performed provided that the completion button CIB is indicated by the pointer. Note, the completion button CIB is operated to end the execution of the object-connecting routine of FIG. 14.

At step S801, various object-connection data, obtained by executing the object-connecting routine of FIG. 14, are suitably processed, and are then stored in the memory medium provided in the image processing computer system. Then, at step S802, the connection-mode scene of the monitor 10, as shown in FIGS. 8, 9, 10, 12 or 13, is returned to the initial menu scene (not shown).

Figure 23:
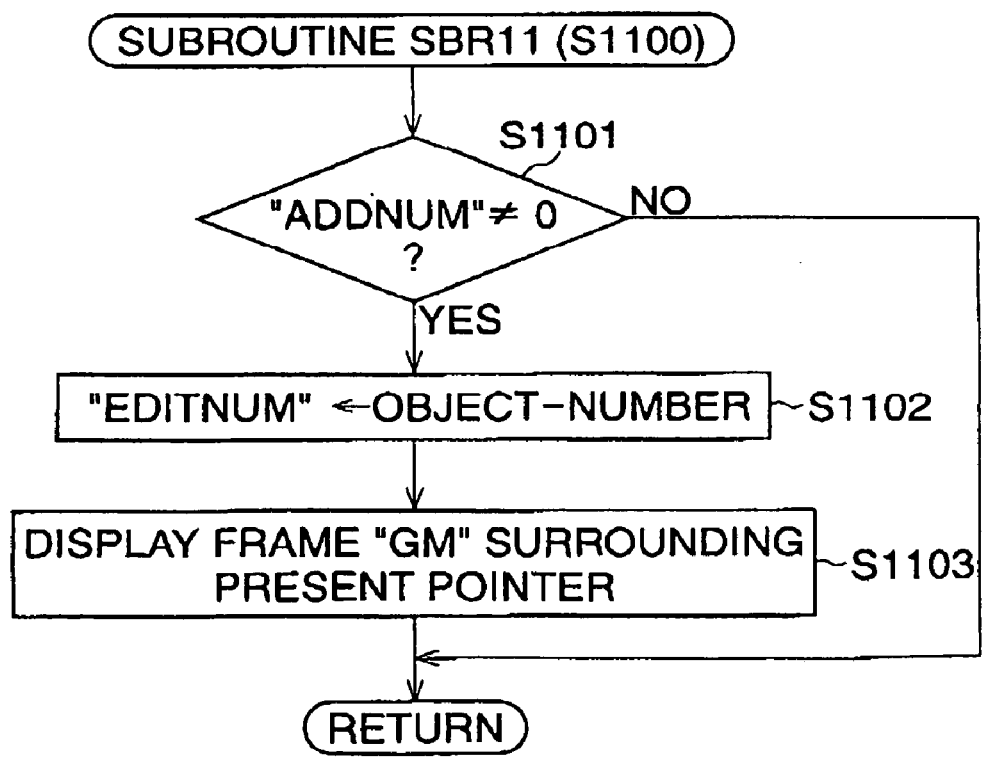
FIG. 23 is a flowchart for a subroutine executed in step S1100 of the subroutine of FIG. 21.

FIG. 23 shows a flowchart for the subroutine SBR11 executed at step S1100 of the subroutine SBR7 shown in FIG. 21. Of course, the execution of the subroutine SBR11 is started when the clicking operation is performed provided that the object displayed on the editing-display area CEA is indicated by the pointer (S701), and provided that the object-transferring/connecting mode is selected (S702; MODE=1).

At step S1101, it is determined whether the variable "ADDNUM" is not "0". If ADDNUM≠0, i.e. if any one of the objects, displayed on the picture-display area GDA, is indicated by clicking on it with the mouse, the control proceeds to step S1102, in which the variable "EDITNUM" is made to be an object-number corresponding to the object indicated by clicking on it with the mouse in the editing-display area CEA (S701).

At step S1103, a broken-line frame GM is displayed on the editing-display area CEA so as to surround the pointer displayed thereon. This situation is similar to that shown in FIG. 10.

At step S1101, if ADDNUM=0, i.e. if any one of the objects, displayed on the picture-display area GDA, is not indicated by clicking on it with the mouse, the subroutine SBR11 once ends. Namely, as long as any one of the objects, displayed on the area GDA, is not indicated by clicking on it with the mouse (ADDNUM=0), the indication of the object in the editing-display area CEA by clicking on it with the mouse (S701) is ignored in the object-transferring/connecting mode (MODE=1).

Figure 24:
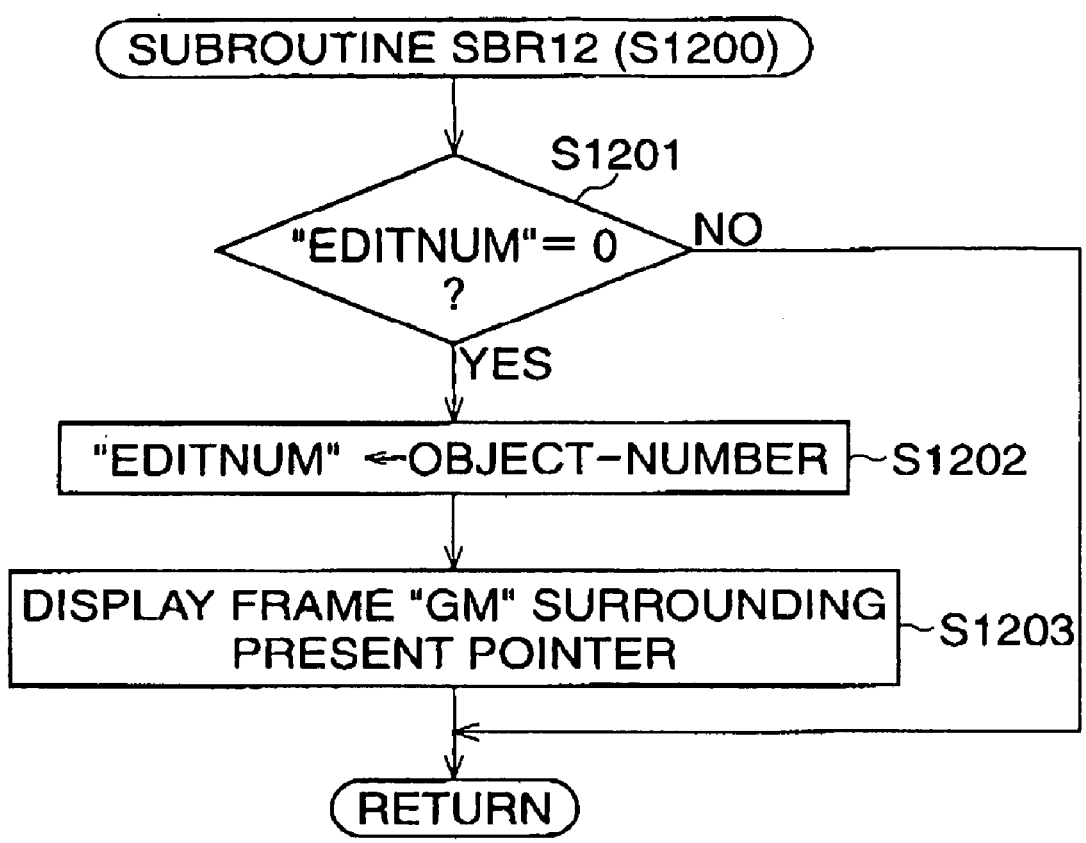
FIG. 24 is a flowchart for a subroutine executed in step S1200 of the subroutine of FIG. 21.

FIG. 24 shows a flowchart for the subroutine SBR12 executed at step S1200 of the subroutine SBR7 shown in FIG. 21. Of course, the execution of the subroutine SBR12 is started when the clicking operation is performed provided that the object displayed on the editing-display area CEA is indicated by the pointer (S701), and provided that the object-arranging mode is selected (S703; MODE=2).

At step S1201, it is determined whether the variable "EDITNUM" is "0". If EDITNUM=0, the control proceeds to step S1202, in which the variable "EDITNUM" is made to be an object-number corresponding to the object indicated by clicking on it with the mouse in the editing-display area CEA (S701).

At step S1203, a broken-line frame GM is displayed on the editing-display area CEA 80 as to surround the pointer displayed thereon. Thus, the indicated object concerned can be optionally rearranged in the editing-display area CEA, as stated hereinbefore with reference to FIGS. 12 and 13.

At step S1201, if EDITNUM=0, i.e. if any one of the objects, displayed on the editing-display area CEA, has been already indicated by clicking on it with the mouse, the subroutine SBR12 once ends. Namely, the indication of the object in the editing-display area CEA concerned is ignored.

Figure 25:
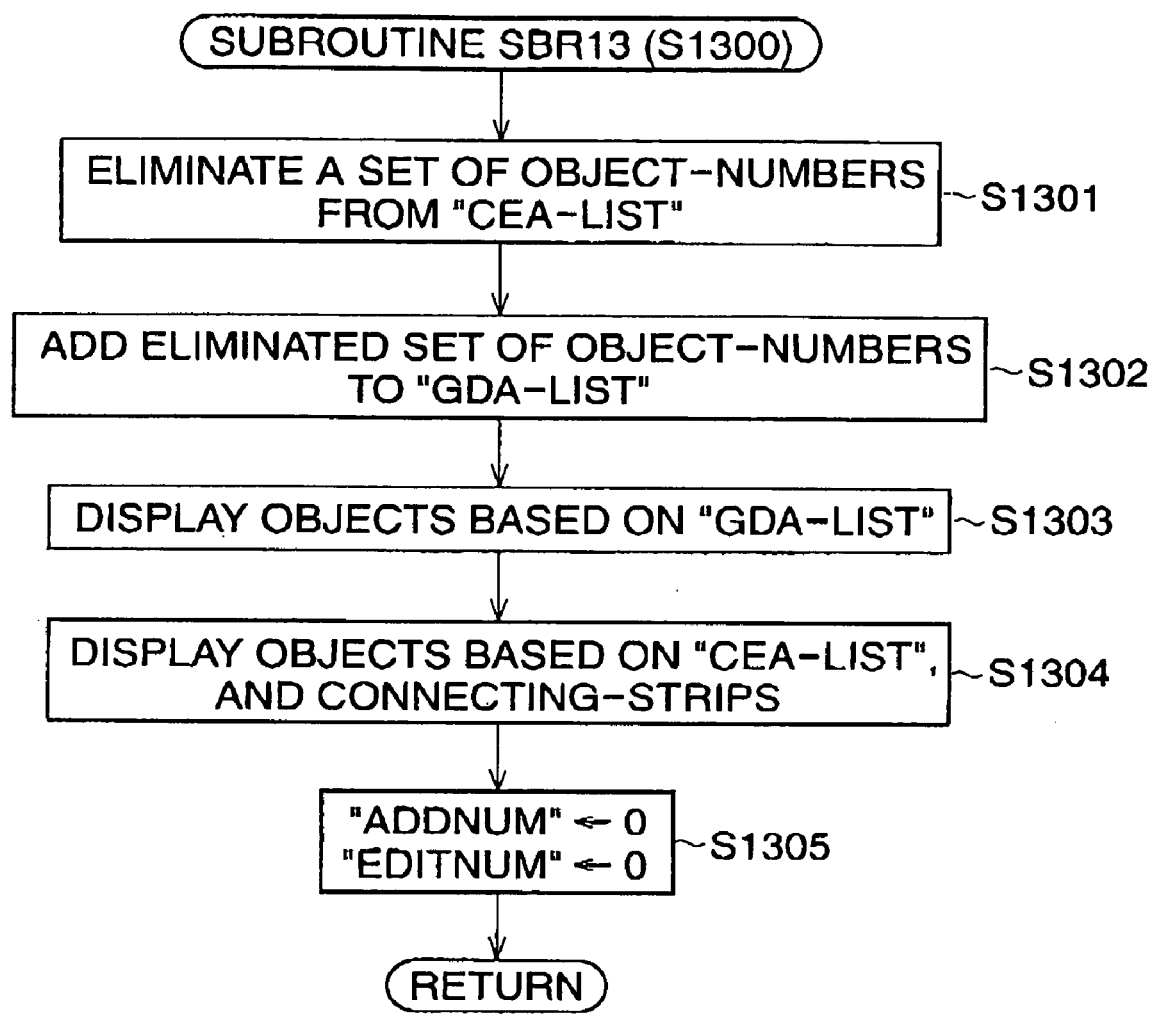
FIG. 25 is a flowchart for a subroutine executed in step S1300 of the subroutine of FIG. 21.

FIG. 25 shows a flowchart for the subroutine SBR13 executed at step S1300 of the subroutine SBR7 shown in FIG. 21. Of course, the execution of the subroutine SBR13 in started when the clicking operation is performed provided that the object displayed on the editing-display area CEA is indicated by the pointer (S701), and provided that the object-deleting mode is selected (S703; MODE=3).

At step S1301, a set of object-numbers, one of which corresponds to the object indicated by clicking on it with the mouse (S701), is eliminated from the CEA-list memory area. Then/, at step S1302, the eliminated set of object-numbers is added to the GDA-list memory area.

At stop S1303, a display of objects is performed on the picture-display area GDA based on the revised GDA-list memory area, to which the eliminated set of object-numbers is added. Then, at step S1304, a display of objects is performed on the editing-display area CEA based on the revised CEA-list memory area, from which the set of object-numbers is eliminated. Of course, the connecting-strips CNS for successively connecting the displayed objects to each other are displayed, whereby connection-relation-ships between the objects can be visually recognized. Subsequently, at step S1305, both the variables "ADDNUM" and "EDITNUM" are reset to be "0".

Figure 26:
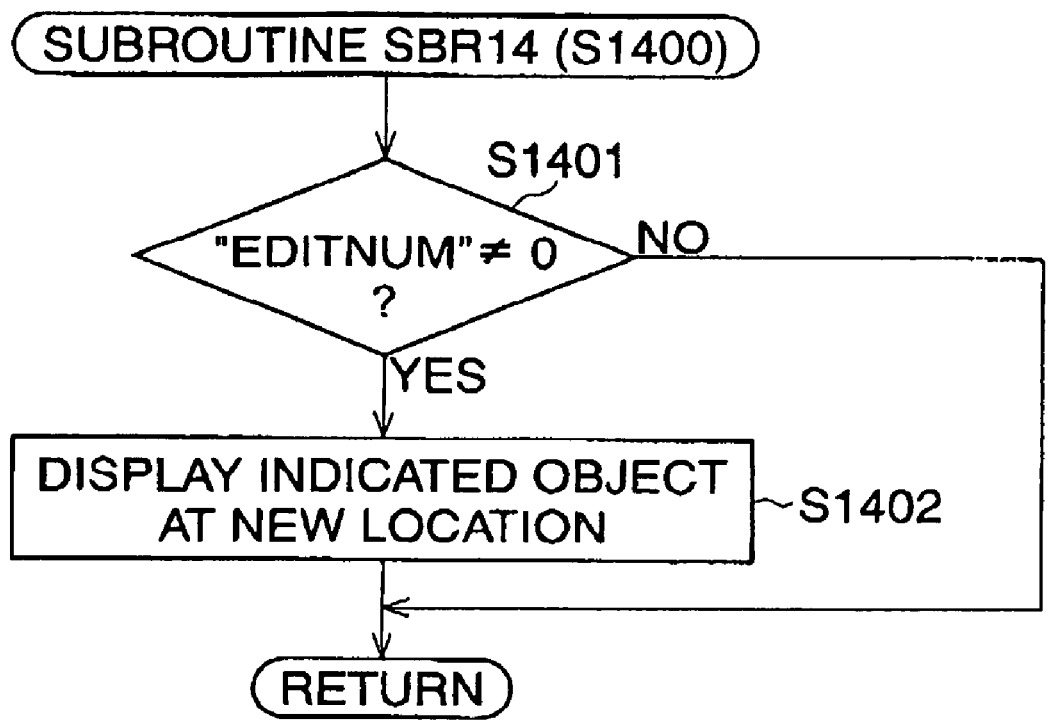
FIG. 26 is a flowchart for a subroutine executed in step S1400 of the subroutine of FIG. 21.

FIG. 26 shows a flowchart for the subroutine SBR14 executed at step S1400 of the subroutine SBR7 shown in FIG. 21. Of course, the execution of the subroutine SBR14 is started when the clicking operation is performed provided that the pointer is out of the objects on the editing-display area CEA (S701), and provided that the object-arranging mode is selected (S704; MODE=2).

At step 81401, it is determined whether the variable "EDITNUM" is not "0". If EDITNUM≠0, i.e. if any one of the objects, displayed on the editing-display area CEA, has been already indicated by clicking on it with the mouse, the control proceeds to step S1402, in which the indicated object concerned is displayed at the new location to which the broken-line frame GM is moved by the pointer on the editing-display area CEA.

At step S1401, if EDITNUM=0, i.e. if any one of the objects, displayed on the editing-display area CEA, has not been indicated by clicking on it with the mouse, the subroutine SBR14 once ends. Namely, as long as any one of the objects, displayed on the editing-display area CEA, has not been indicated by clicking on it with the mouse, the clicking operation concerned is ignored.

Figure 27:
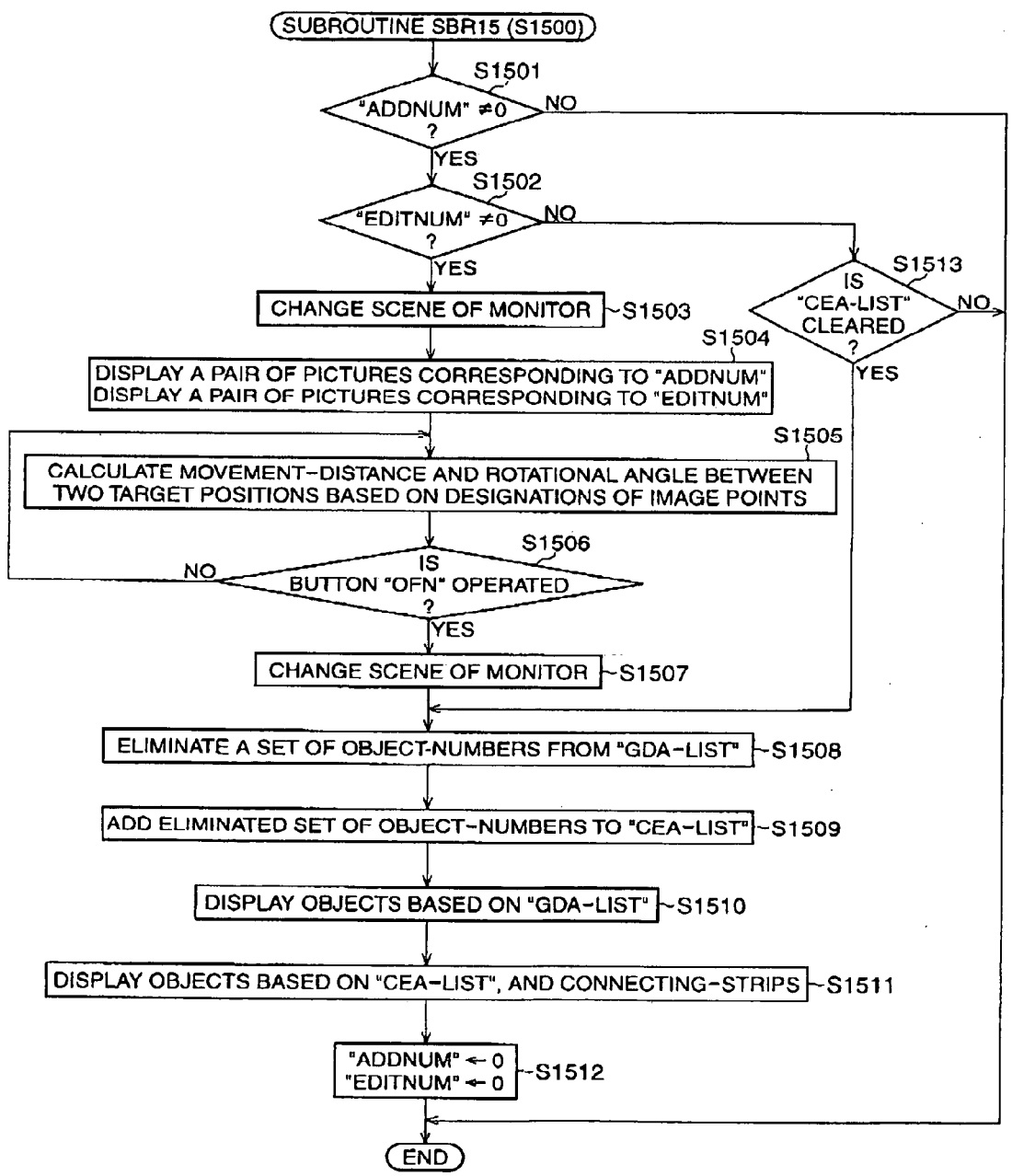
FIG. 27 is a flowchart for a subroutine executed in step S1500 of the subroutine of FIG. 21.

FIG. 27 shows a flowchart for the subroutine SBR15 executed at step S1500 of the subroutine SBR7 shown in FIG. 21. Of course, the execution of the subroutine SBR15 is started when the clicking operation is performed provided that the pointer is out of the objects on the editing-display area CEA, and provided that the object-transferring/connecting mode is selected (S705; MODE=1).

At step S1501, it is determined whether the variable "ADDNUM" is not "0", If ADDNUM≠0, i.e. if any one of the objects, displayed on the picture-display area GDA, is indicated by clicking on it with the mouse, the control proceeds to step S1502, in which it is determined whether the variable "EDITNUM" is not "0". If EDITNUM≠0, i.e. if any one of the objects, displayed on the editing-display area CEA, is indicated by clicking on it with the mouse, the control proceeds to step S1503, in which the scene of the monitor 10, as shown in FIG. 10, is changed into the scene as shown in FIG. 11, thereby processing a connection between the object indicated in the picture-display area GDA (S1501) and the object indicated in the editing-display area CEA (S1502).

At step S1504, a pair of pictures (IM5 and IM6), represented by the object (OB5) corresponding to the variable "EDITNUM", and a pair of pictures (IM7 and IM8), represented by the object (OB7) corresponding to the variable "ADDNUM", are displayed on the monitor 10, as shown in FIG. 11. Then, at step S1505, a movement distance and a rotational angle between two target positions (RP1 and RP2) are calculated on the basis of designations of image points, representing two connection points (RC1 and RC2), photographed in the two pairs of the pictures, as explained hereinbefore.

At step S1506, it is monitored whether the completion button OFN has been operated by clicking on it with the mouse. When the operation of the button OFN is not confirmed, the control returns to step S1505. On the other hand, when the operation of the completion button OFN is confirmed, i.e. when the calculations are completed, the control proceeds to step S1507, in which the scene of the monitor 10, as shown in FIG. 11, is changed to the scene as shown in FIG. 12.

At S1508, a set of object-numbers, one of which corresponds to the object indicated in the picture-display area GDA by clicking on it with the mouse (S1501), is eliminated from the GDA-list memory area. Then, at step S1509, the eliminated set of object-numbers is added to the CEA-list memory area.

At step S1510, a display of objects is performed on the picture-display area GDA based on the revised GDA-list memory area, from which the set of object-numbers is eliminated. Then, at step S1511, a display of objects is performed on the editing-display area CEA based on the revised CEA-list memory area, to which the eliminated set of object-numbers is added. Of course, the connecting-strips CNS for successively connecting the displayed objects to each other are displayed, whereby connection-relationships between the objects can be visually recognized. Subsequently, at step S1512, both the variables "ADDNUM" and "EDITNUM" are reset to be "0".

At step S1501, if ADDNUM=0, i.e. if none of the objects, displayed on the picture-display area GDA, is indicated by clicking on it with the mouse, the subroutine SBR15 once ends. Namely, the clicking operation (S701), which is performed provided that the pointer is out of the object, is ignored.

At step S1501, if ADDNUM≠0, and, at step S1502, if EDITNUM=0, i.e. if only one of the objects, displayed on the picture-display area GDA, is indicated by clicking on it with the mouse, the control proceeds from step S1502 to step S1513, in which it is determined whether the CEA-list memory area is cleared. If the CEA-list memory area is cleared, i.e. if the CEA-list memory area stores no object-number, the control jumps from step S1513 to step S1508, and the routine comprising steps S1508 to S1512 is executed, whereby only a transfer of objects concerned from the picture-display area GDA to the editing-display area CEA is performed, as explained with reference to FIGS. 8 and 9.

After all the pairs of pictures are successively connected to each other by executing the object-connecting routine shown in FIG. 14, a routine for producing a survey map is executed. In the execution of the survey-map-producing routine, a survey map section is produced on the basis of each pair of pictures, and the survey map sections are connected on the basis of the connection data obtained by the execution of the object-connecting routine, thereby producing the survey map like the one shown in FIG. 1.

In the above-mentioned embodiment, at least three photographing operations may be performed to produce a survey map section. Of course, in this case, although a set of at least three pictures is obtained, in reality, a pair of pictures is suitably selected from among the at least three pictures for the production of the survey map section.

Finally, it will be understood by those skilled in the art that the foregoing description is of preferred embodiments of the system, and that various changes and modifications may be made to the present invention without departing from the spirit and scope thereof.

The present disclosure relates to subject matter contained in Japanese Patent Application No. 11-188678 (filed on Jul. 2, 1999), which is expressly incorporated herein, by reference, in its entirety.

What is claimed is:

1. An image processing computer system for a photogrammetric analytical measurement in which a survey map is produced by connecting a first group of pictures and a second group of pictures, said system comprising:
 a monitor that displays a first scene, said monitor including a picture-display area and an editing-display area;
 a first monitor controller that selectively displays only one picture in each of said first group and said second group, on said picture-display area of said first scene;
 a second monitor controller that transfers a displayed picture from said picture-display area to said editing-display area and vice versa; and
 a third monitor controller that visually displays a connection relationship between pictures displayed on said editing-display area of said first scene;
 wherein said first group comprises pictures featuring a photographed target located at a first target position and said second group comprises pictures featuring the photographed target located at a second target position; and
 wherein said image processing computer system is configured to produce a survey map by representing objects, in the displayed pictures that have the connection relationship, in a three-dimensional coordinate system that is based on at least one of the first target position and the second target position.

2. An image processing computer system as set forth in claim 1, wherein a display of pictures on said picture-display area and said editing-display area is performed at a reduced size.

3. An image processing computer system as set forth in claim 1, wherein each of said first and second groups includes at least two sets of pictures, and all respective pictures, included in the sets forming each group, are displayed on said picture-display area in photographing order under control of said first monitor controller.

4. An image processing computer system as set forth in claim 3, wherein, upon transferring one of the respective pictures, included in the sets forming each group, from said picture-display area to said editing-area and vice versa, a transfer of the remaining pictures is simultaneously performed under control of said second monitor controller.

5. An image processing computer system as set forth in claim 4, wherein, upon transferring one of the respective pictures, included in the sets forming each group, from said picture-display area to said editing-area, a transfer of the remaining pictures is simultaneously performed under control of said second monitor controller, and all the respective pictures, included in the sets forming the other group, are displayed on said picture-display area under controller of said first monitor controller.

6. An image processing computer system as set forth in claim 1, further comprising a transfer-indicator that indicates a picture to be transferred from said picture-display area to said editing-display area and vice versa.

7. An image processing computer system as set forth in claim 6, wherein a marker is displayed on said editing-display area under control of said second monitor controller to indicate a location, at which the picture is to be transferred from said picture-display area to said editing-display area, when said picture is indicated by said transfer-indicator.

8. An image processing computer system as set forth in claim 7, wherein said marker comprises a frame representing an outline of the picture to be transferred from said picture-display area to said editing-display area.

9. An image processing computer system as set forth in claim 7, wherein said marker is movable under control of said second monitor controller in said editing-display area.

10. An image processing computer system as set forth in claim 1, wherein a connecting-strip is displayed on said editing-display area under control of said third monitor controller to indicate said connection relationship between the pictures displayed on said editing-display area of said first scene.

11. An image processing computer system as set forth in claim 10, wherein said connecting-strip is displayed as a strip connected between the centers of the two adjacent pictures at the back faces thereof.

12. An image processing computer system as set forth in claim 1, further comprising a fourth monitor controller that moves a picture, transferred from said picture-display area to said editing-display area, from one location to another location on said editing-display area.

13. An image processing computer system as set forth in claim 12, further comprising a movement-indicator that indicates a picture to be moved on said editing-display area.

14. An image processing computer system as set forth in claim 13, wherein a marker is displayed on said editing-display area under control of said fourth monitor controller to indicate a location, at which the picture is to be moved, when said picture is indicated by said movement-indicator.

15. An image processing computer system as set forth in claim 14, wherein said marker comprises a frame representing an outline of the picture to be moved on said editing-display area.

16. An image processing computer system as set forth in claim 1, further comprising a connection-indicator that indicates a picture, displayed on said picture-display area, and a picture, displayed on said editing-display area, to be connected to each other when the former picture is transferred to said editing-display area.

17. An image processing computer system as set forth in claim 16, further comprising a fourth monitor controller that changes said first scene of said monitor into a second scene in which a connection-processing for connecting said pictures to each other is performed before said former picture is transferred to said editing-display area.

18. An image processing computer system as set forth in claim 17, wherein two pictures, included in a set forming said first group, and two pictures, included in a set forming said second group, are displayed on said second scene of said monitor under control of said fourth monitor controller for said connection-processing.

19. An image processing computer system as set forth in claim 18, wherein said two pictures, included in a set forming said first group, and said two pictures, included in a set forming said second group, have at least two common connecting-image-points for said connection-processing.

20. An image processing method for a photogrammetric analytical measurement in which a survey map is produced by connecting a first group of pictures and a second group of pictures, said method comprising:

displaying a scene on a monitor that includes a picture-display area and an editing-display area;

selectively displaying only one picture in each of said first group and said second group, on the picture-display area of the monitor;

transferring a displayed picture from said picture-display area to said editing-display area;

visually displaying a connection relationship between pictures displayed on said editing-display area of said scene; and wherein said first group comprises pictures featuring a photographed target located at a first target position and said second group comprises pictures featuring the photographed target located at a second target position; and wherein said image processing computer system is configured to produce a survey map by representing objects, in the displayed pictures that have the connection relationship, in a three-dimensional coordinate system that is based on at least one of the first target position and the second target position.

21. A memory medium storing an image processing program for a photogrammetric analytical measurement in which a survey map is produced by connecting a first group of pictures and a second group of pictures, said program including:

displaying a scene on a monitor that includes a picture-display area and an editing-display area;

selectively displaying only one picture in each of said first group and said second group, on the picture-display area of the monitor;

transferring a displayed picture from said picture-display area to said editing-display area; and visually displaying a connection relationship between pictures displayed on said editing-display area of said scene;

wherein said first group comprises pictures featuring a photographed target located at a first target position and said second group comprises pictures featuring the photographed target located at a second target position; and wherein said image processing computer system is configured to produce a survey map by representing objects, in the displayed pictures that have the connection relationship, in a three-dimensional coordinate system that is based on at least one of the first target position and the second target position.

* * * * *